United States Patent
Singh

(10) Patent No.: US 12,548,686 B2
(45) Date of Patent: Feb. 10, 2026

(54) SYSTEM FOR TRANSPORTING RADIOACTIVE MATERIALS

(71) Applicant: HOLTEC INTERNATIONAL, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 344 days.

(21) Appl. No.: 18/465,743

(22) Filed: Sep. 12, 2023

(65) Prior Publication Data

US 2024/0087765 A1    Mar. 14, 2024

Related U.S. Application Data

(60) Provisional application No. 63/405,967, filed on Sep. 13, 2022.

(51) Int. Cl.
| | |
|---|---|
| *G21F 5/12* | (2006.01) |
| *G21F 5/00* | (2006.01) |
| *G21F 5/008* | (2006.01) |
| *G21F 5/08* | (2006.01) |

(52) U.S. Cl.
CPC ........... *G21F 5/12* (2013.01); *G21F 5/008* (2013.01); *G21F 5/08* (2013.01)

(58) Field of Classification Search
CPC .............. G21F 5/12; G21F 5/008; G21F 5/08
See application file for complete search history.

(56) References Cited

U.S. PATENT DOCUMENTS

| | | |
|---|---|---|
| 4,190,160 A | 2/1980 | Andersen et al. |
| 4,209,420 A | 6/1980 | Larker |
| 4,299,659 A * | 11/1981 | Hame .................. G21F 9/34 |
| | | 250/506.1 |
| 4,336,460 A | 6/1982 | Best et al. |
| 4,620,106 A | 10/1986 | Olivieri et al. |
| 4,810,890 A * | 3/1989 | Blum .................. G21F 5/08 |
| | | 250/507.1 |
| 5,894,134 A | 4/1999 | Kissinger |

(Continued)

FOREIGN PATENT DOCUMENTS

| | | |
|---|---|---|
| CZ | 308517 | 10/2020 |
| EP | 2827336 A1 | 1/2015 |

(Continued)

OTHER PUBLICATIONS

International Search Report and Written Opinion of PCT/US2023/73975, Issued Jan. 22, 2024.

*Primary Examiner* — Nicole M Ippolito

(74) *Attorney, Agent, or Firm* — The Belles Group, P.C.

(57) ABSTRACT

A system for transporting radioactive materials which may include a containment vessel, a thermal shield, and an impact limiter. The containment vessel may include a vessel body having a storage cavity for receiving radioactive materials, a lid coupled to an upper portion of the vessel body to enclose a top end of the storage cavity, and a lid seal such as a gasket positioned between the lid and the upper portion of the vessel body. The thermal shield may be positioned over the lid. The first impact limiter may be positioned over the thermal shield. The thermal shield may be resistant to high temperatures and may help to protect the integrity of the lid seal when the system is subjected to high temperatures, such as during a fire condition.

20 Claims, 15 Drawing Sheets

(56) References Cited

U.S. PATENT DOCUMENTS

| | | |
|---|---|---|
| 6,299,950 B1 | 10/2001 | Byington et al. |
| 6,953,125 B2 | 10/2005 | Mingot et al. |
| 11,081,249 B2 | 8/2021 | Singh et al. |
| 11,373,773 B2 | 6/2022 | Sisley et al. |
| 11,610,696 B2 | 3/2023 | Singh et al. |
| 2013/0068578 A1 | 3/2013 | Saito et al. |
| 2014/0192946 A1 | 7/2014 | Singh |
| 2015/0092903 A1 | 4/2015 | Tuite et al. |
| 2015/0213910 A1 | 7/2015 | Allan et al. |
| 2019/0066858 A1 | 2/2019 | Sisley |
| 2021/0118586 A1 | 4/2021 | Singh et al. |
| 2021/0343439 A1* | 11/2021 | Singh .................. G21F 5/14 |

FOREIGN PATENT DOCUMENTS

| | | |
|---|---|---|
| EP | 3594965 | 1/2020 |
| KR | 10-1885607 | 9/2018 |
| KR | 10-1903130 | 10/2018 |
| RU | 75496 | 8/2008 |

\* cited by examiner

SYSTEM FOR TRANSPORTING RADIOACTIVE MATERIALS

CROSS-REFERENCE TO RELATED APPLICATIONS

This application claims the benefit of U.S. Provisional Patent Application Ser. No. 63/405,967, filed Sep. 13, 2022, which is incorporated herein by reference in its entirety.

BACKGROUND

The present invention relates generally to systems and apparatuses for storing high level radioactive waste such as used or spent nuclear fuel. In the operation of nuclear reactors, the nuclear energy source is in the form of hollow zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor and loaded into a canister while submerged in a spent fuel pool. The canisters have limited ability to block or attenuate the gamma and neutron radiation emitted by the decaying SNF other than borated water remaining in the canister from the spent fuel pool. Thus, when the nuclear waste is transferred from the spent fuel pool to an interim or long-term storage area, the canister is placed into a radiation-shielded outer ventilated overpack or cask. Casks of this type must meet strict requirements for accident conditions. There remains a need for improvements in systems for transporting radioactive materials to better account for different accident scenarios.

BRIEF SUMMARY

The present application discloses a system for transporting radioactive materials which may include a containment vessel, a thermal shield, and an impact limiter. The containment vessel may include a vessel body having a storage cavity for receiving radioactive materials, a lid coupled to an upper portion of the vessel body to enclose a top end of the storage cavity, and a lid seal such as a gasket positioned between the lid and the upper portion of the vessel body. The thermal shield may be positioned over the lid. The first impact limiter may be positioned over the thermal shield. The thermal shield may be resistant to high temperatures and may help to protect the integrity of the lid seal when the system is subjected to high temperatures, such as during a fire condition.

In one aspect, the invention may be a system for transporting radioactive materials, the system comprising: a containment vessel extending along a longitudinal axis from a top end to a bottom end, the containment vessel comprising: a vessel body having a storage cavity configured to receive radioactive materials; a lid coupled to an upper portion of the vessel body to enclose a top end of the storage cavity; and a lid seal positioned between the lid and the upper portion of the vessel body to hermetically seal the top end of the storage cavity; a thermal shield comprising a top plate and an annular skirt extending downward from the top plate to form a thermal shield cavity; a first impact limiter configured to absorb kinetic energy; and the first impact limiter and the thermal shield coupled to the containment vessel, the thermal shield located between the first impact limiter and the containment vessel so that the lid seal is located within the thermal shield cavity.

In another aspect, the invention may be a system for transporting radioactive materials, the system comprising: a containment vessel extending along a longitudinal axis from a top end to a bottom end, the containment vessel comprising: a vessel body having a storage cavity configured to receive radioactive materials; and a lid coupled to an upper portion the vessel body to enclose a top end of the storage cavity; a thermal shield comprising a top plate, the top plate being a multi-layer construct comprising a first layer and a second layer; a first impact limiter configured to absorb kinetic energy; and the first impact limiter and the thermal shield coupled to the containment vessel, the top plate of the thermal shield located between the first impact limiter and the lid of the containment vessel.

In yet another aspect, the invention may be a system for transporting radioactive materials, the system comprising: a containment vessel extending along a longitudinal axis from a top end to a bottom end, the containment vessel comprising: a vessel body having a storage cavity configured to receive radioactive materials; a lid coupled to an upper portion of the vessel body to enclose a top end of the storage cavity; and a lid seal positioned between the lid and the upper portion of the vessel body to hermetically seal the top end of the storage cavity; a thermal shield comprising a top plate having an effective thermal conductivity of 3 Watts/(Meter×Kelvin) or less; a first impact limiter configured to absorb kinetic energy; and the first impact limiter and the thermal shield coupled to the containment vessel, the top plate of the thermal shield located between the first impact limiter and the lid of the containment vessel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
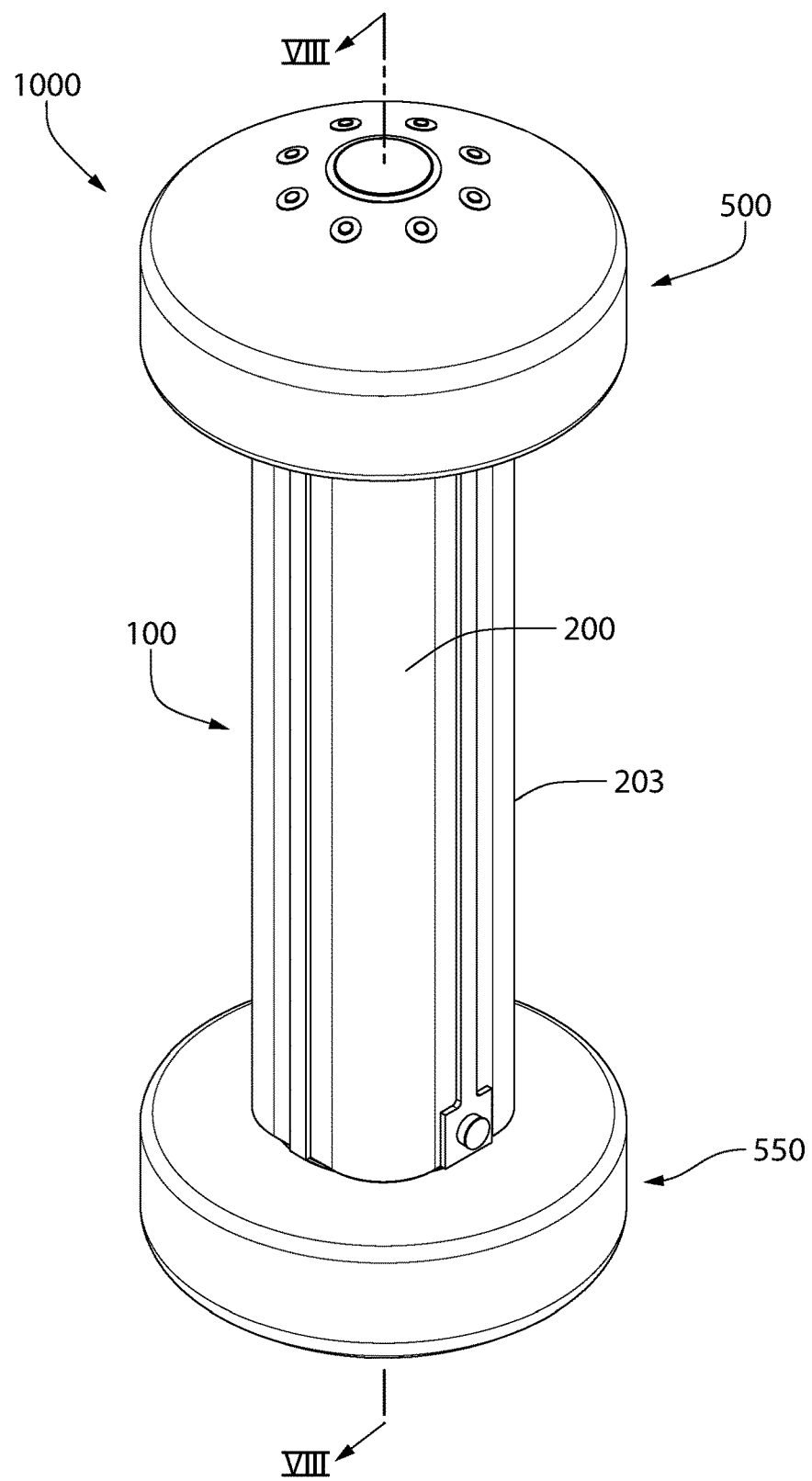
FIG. 1 is a top perspective view of a system for transporting radioactive materials in accordance with an embodiment of the present invention.

All drawings are schematic and not necessarily to scale. Features shown numbered in certain figures which may appear un-numbered in other figures are the same features unless noted otherwise herein.

DETAILED DESCRIPTION

The features and benefits of the invention are illustrated and described herein by reference to non-limiting exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

As used herein, the terms "seal weld or welding" shall be construed according to its conventional meaning in the art to be a continuous weld which forms a gas-tight joint between the parts joined by the weld.

Referring first to FIGS. 1-5, a system for transporting radioactive materials 1000 will be described in accordance with an embodiment of the present invention. The system 1000 generally comprises a containment vessel 100, a first impact limiter 500 coupled to a first end (i.e., upper end) of the containment vessel 100, a second impact limiter 550 coupled to a second end (i.e., lower end) of the containment vessel 100, and a thermal shield 600. The thermal shield 600 is visible only in FIGS. 4 and 5 among the set of FIGS. 1-5 because it is hidden from view in FIGS. 1-3 by the first impact limiter 500.

The containment vessel 100 extends along a longitudinal axis A-A and generally comprises a vessel body 200, a lid 300 that is coupled to an upper portion of the vessel body 200, and a lid seal 400 that is positioned between the lid 300 and the upper portion of the of the vessel body 200. The lid 300 and the lid seal 400 are only visible in FIGS. 4 and 5 among the set of FIGS. 1-5 because they are hidden from view in FIGS. 1-3 by the first impact limiter 500. Some details about the containment vessel 100 and its constituent components will be described below. Additional details about the containment vessel 100 and/or its components may be described in U.S. Pat. No. 11,081,249, the entirety of which is incorporated herein by reference.

The vessel body 200 may be elongated between a first end 201 and a second end 202. The vessel body 200 may comprise a sidewall 203 that extends between the first and second ends. The sidewall 203 may be cylindrical, although other shapes may be used in other embodiments. The vessel body 200 may define a storage cavity 204 that is configured to receive and hold radioactive materials, such as spent nuclear fuel or other forms of radioactive waste. The vessel body 200 may be constructed to provide radiation shielding to ameliorate the gamma and neutron radiation emitted by the decaying spent nuclear fuel or other high level radioactive waste held in the storage cavity 103. The vessel body 200 may be any commercially-available storage and/or transport cask, such as for example without limitation HI-STAR or HI-STORM casks available from Holtec® International of Camden, New Jersey or other.

The vessel body 200 may be vertically elongated in the direction of the longitudinal axis A-A between the first and second ends 201, 202. The first end 201 may form a bottom end of the vessel body 200 and the second end 202 may form a top end of the vessel body 200. The bottom end of the vessel body 200 may be closed (such as by a base plate or the like) and the top end of the vessel body 200 may be open, thereby forming a passageway into the storage cavity 204. The vessel body 200 may be formed from metal. Radioactive materials, such as spent nuclear fuel assemblies or other nuclear waste, may be insertable into the storage cavity 204 through the open top end 202 of the vessel body 200 prior to securing the lid 300 thereon. The storage cavity 204 may extend for a full height of the vessel body 200 in one embodiment. The storage cavity 204 may be configured to hold only a single spent nuclear fuel canister in one embodiment. This may be ensured based on the shape of the vessel body 200 and the cross-sectional area of the storage cavity 204, among other possible techniques.

Figure 9:
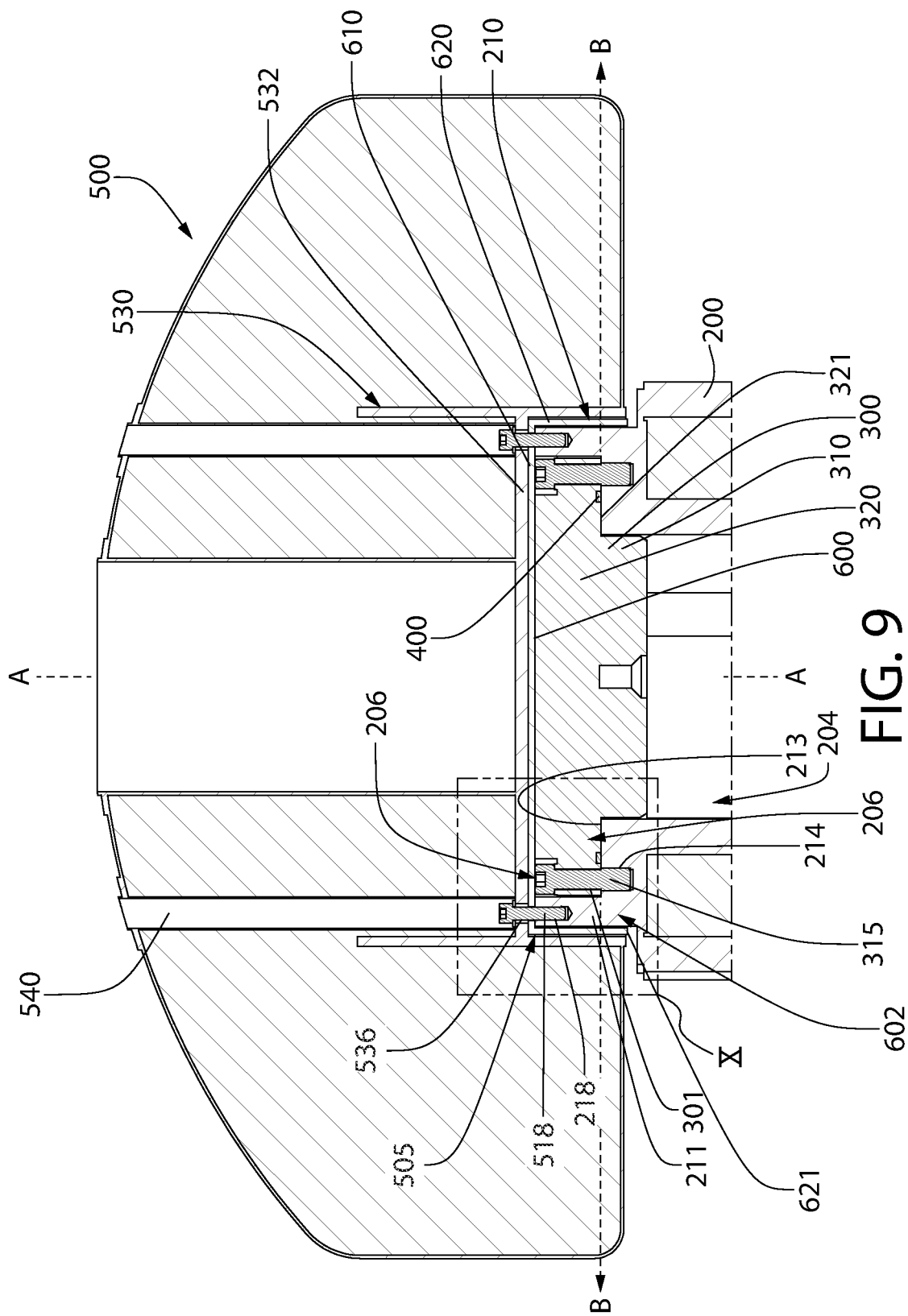
FIG. 9 is a close-up view of area IX of FIG. 8.
Figure 10:
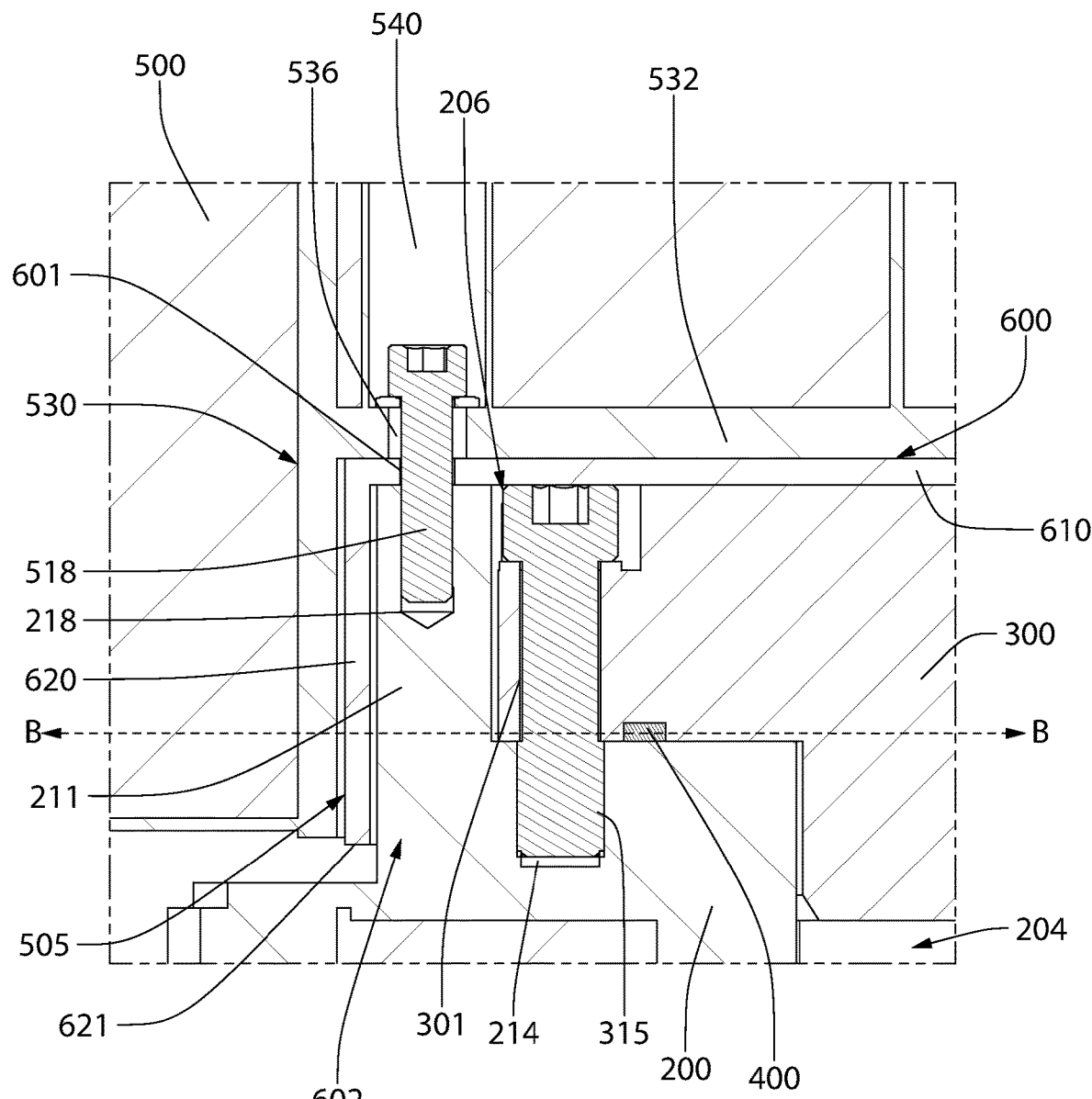
FIG. 10 is a close-up view of area X of FIG. 9.

The vessel body 200 may include an upper portion 210 and a lower portion 220. The upper portion 210 may be an uppermost part of the vessel body 200 which includes the second end 202. The lower portion 220 may be a lowermost part of the vessel body 200 which includes the first end 201. Furthermore, the vessel body 200 may comprise a main body portion 205 that extends between the upper and lower portions 210, 220. The upper portion 210 of the vessel body 200 may comprise an annular collar 211 that extends upwardly from the main body portion 205 of the vessel body 200. The annular collar 211 may comprise an inner surface 212 that defines an entry passageway 206 into the storage cavity 204. The details of the upper portion 210 including the annular collar 211 are shown in FIGS. 8-10 and will be described in some additional detail with reference to those figures below.

The main body portion 205 may be formed by multiple vertically elongated cylindrical shells and radiation shielding materials. Alternatively, the main body portion 205 may be collectively formed by a plurality of axially aligned and vertically stacked cylindrical shell segments seal welded together at the joints therebetween to form an elongated shell assemblage. In one embodiment, the vessel body 200 may be a composite construction generally comprising a structural inner shell, an intermediate gamma shield, and an outer neutron shielding jacket. In such an embodiment, the shell, gamma shield, and jacket may be generally annular and cylindrical in shape, and may be concentrically aligned with each other and the longitudinal axis A-A. While the term "cylindrical" is used herein, it should be noted that the shape of the main body portion 205 is not limited to being cylindrical and other shapes, including those with square, triangular, hexagonal, octagonal, or other cross-sectional shapes, may be used.

Figure 8:
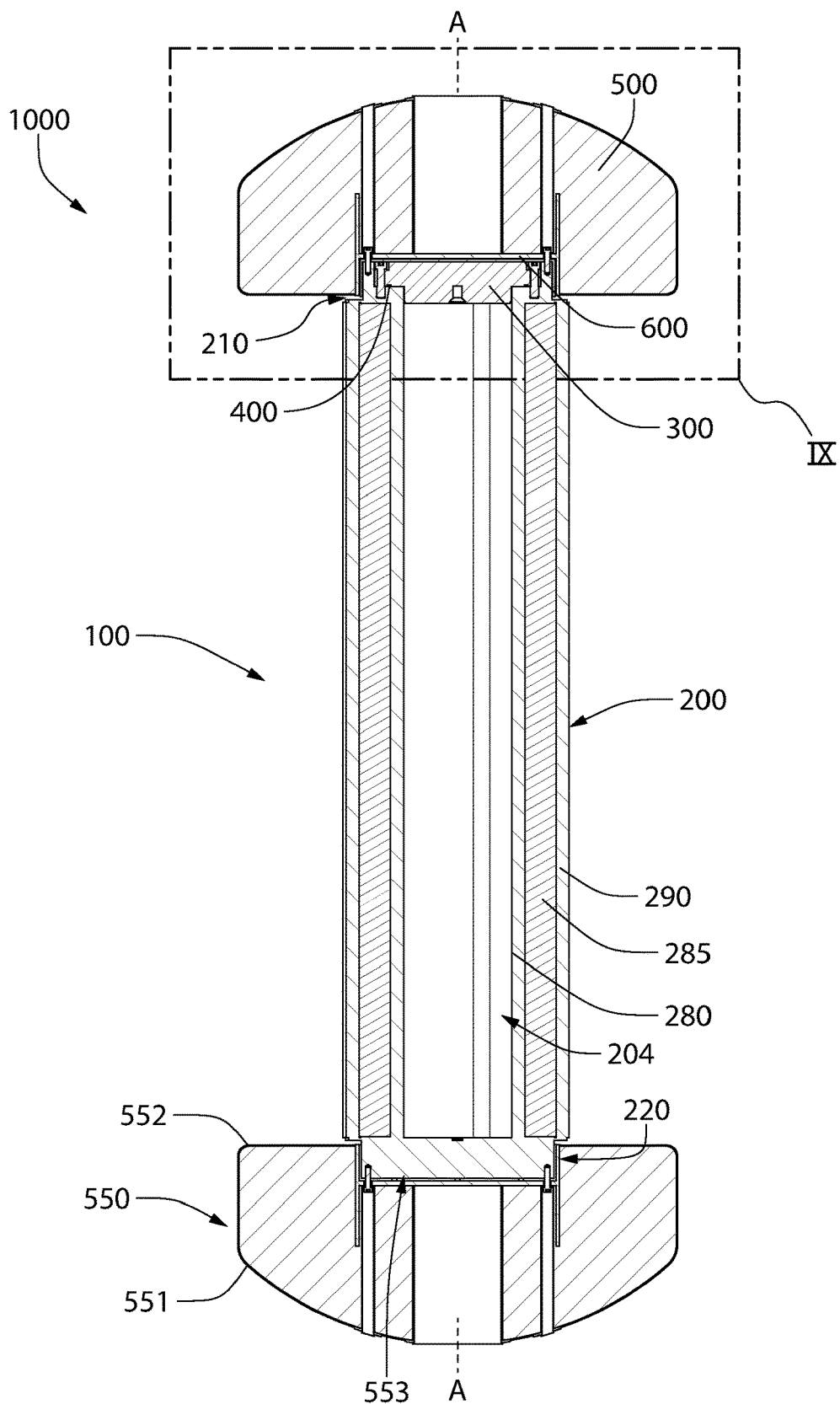
FIG. 8 is a cross-sectional view taken along line VIII-VIII of FIG. 1.

With brief reference to FIG. 8, in certain embodiments the vessel body 200 may include an inner shell 280, an outer shell 290, and an intermediate gamma shield 285 located in the space between the inner and outer shells 280, 290. The inner shell 280 may be formed of a structural metal such as steel (e.g. stainless steel or other) which forms the innermost part of the main body portion 205 and whose interior surface forms the storage cavity 204 of the vessel body 200 which holds the radioactive materials. The outer shell 290 may be integral with the inner shell 280 or a separate part that is coupled thereto. The outer shell 290 may be formed from the same material as the inner shell 280.

The intermediate gamma shield 285 may be formed of a radiation shielding material, and more particularly a gamma shielding material effective for blocking gamma radiation emitted by the radioactive material stored in the storage cavity 204 of the vessel body 200. The intermediate gamma shield 285 may be formed of lead of suitable thickness in some embodiments. However, other dense gamma blocking materials such as concrete, copper, suitably thick steel, etc. may alternatively be used as some non-limiting additional examples. The inner shell 280 and the intermediate gamma shield 285 may be in substantial conformal contact in some embodiments. Alternatively, the inner shell 280 and the intermediate gamma shield 285 may be radially spaced apart forming an annular gap therebetween. Both the inner shell 280 and the gamma shield 285 formed of dense steel and lead material types described above are each effective for gamma blocking applications. An outer neutron shielding jacket (not shown) may be positioned around the exterior of the vessel body 200. The outer neutron shielding jacket may be formed from a boron-containing neutron shielding material such as Metamic® or Holtite™, although other neutron scattering/attenuating materials may be used.

Further details regarding the construction and structure of the main body portion 205 may be described in U.S. Pat. No. 11,081,249, which has been incorporated herein by reference.

The lid 300 may be a disc-shaped component that is configured to nest within the entry passageway 206 defined by the annular collar 211 when the lid 300 is coupled to the vessel body 200. Of course, the lid 300 may take on other shapes designed to fit the shape of the opening in the top end (i.e., the second end 202) of the vessel body 200 to close and hermetically seal the top end of the storage cavity 204. The lid 300 may comprise a plurality of holes 301 through which fasteners such as bolts or the like may extend for purposes of coupling the lid 300 to the vessel body 200.

The upper portion 210 of the vessel body 200 may comprise the annular collar 211 and a seal seat 213. The annular collar 211 may comprise the seal seat 213. The seal seat 213 may extend inwardly from the inner surface 212 of the annular collar 211 at a bottom end of the annular collar 211. Stated another way, the annular collar 211 may extend upwardly from the seal seat 213 along an outer edge of the seal seat 213. The seal seat 213 may form an upwardly facing surface or shoulder that is exposed when the lid 300 is not coupled to the vessel body 200. The vessel body 200 may comprise a plurality of holes 214 formed into the seal seat 213. The lid 300 may be positioned within the entry passageway 206 so that the holes 301 in the lid 300 align with the holes 214 in the seal seat 213. Fasteners such as bolts, screws, or the like may be inserted through the holes 301 in the lid 300 and into the holes 214 in the seal seat 213 to secure the lid 300 to the vessel body 200. The lid 300 may include a dual-lid assembly including inner and outer lids in some embodiments, such as described in U.S. Pat. No. 11,081,249 which was previously incorporated herein by reference. Alternatively, the lid 130 may be a single, monolithic structure. The lid 300 may be formed from metal such as steel, including without limitation stainless steel, and may have a sufficient thickness to effectively block gamma radiation emitted by radioactive materials stored in the storage cavity 204 of the vessel body 200. It should be noted that the lid 300 may be formed from other metallic and non-metallic radiation blocking materials, such as lead, concrete, and the like.

The lid seal 400 may comprise a gasket or O-ring. The lid seal 400 may be formed from a polymeric material. The lid seal 400 may be formed from an elastomeric material or an elastomer type polymer, such as rubber, styrene-butadiene block copolymers, silicone elastomers, fluoroelastomers, polyurethane elastomers, or other thermoplastic elastomers, although the specific material used for the lid seal 400 is not to be limiting of the invention in all embodiments. The lid seal 400 may be a ring-shaped element that forms a closed-loop that surrounds an opening. The lid seal 400 is circular in the exemplified embodiment, although other shapes are possible and may be dictated by the shape of the lid 300 and the entry passageway 206. The lid seal 400 may be positioned between a bottom surface of the lid 300 and the upper portion 210 of the vessel body 200 to hermetically seal the top end of the storage cavity 204 when the lid 300 is coupled thereto. More specifically, the lid seal 400 may be positioned between the bottom surface of the lid 300 and the seal seat 213 to achieve the appropriate hermetic sealing of the top end of the storage cavity 204. The hermetic seal between the lid 300 and the vessel body 200 may be important to ensure that gamma and neutron radiation emitted by the radioactive materials stored in the storage cavity 204 do not pass into the atmosphere outside of the storage cavity 204.

As noted above, the first impact limiter 500 is configured to be coupled to the upper portion 210 of the vessel body 200 and the second impact limiter 550 is configured to be coupled to the lower portion 220 of the vessel body 200. The first and second impact limiters 500, 550 may be configured to absorb kinetic energy, which may assist in protecting the vessel body 200 against damage during a drop scenario. The impact limiters 500, 550 may provide protection to the containment vessel 100 and/or its contents during certain postulated accidents. The impact limiters 500, 550 may protect the containment vessel 100 by ensuring that the impact limiters 500, 550 are first to contact a hard surface during a drop scenario wherein the system 1000 is dropped onto a flat, essentially unyielding horizontal surface.

Figure 6A:
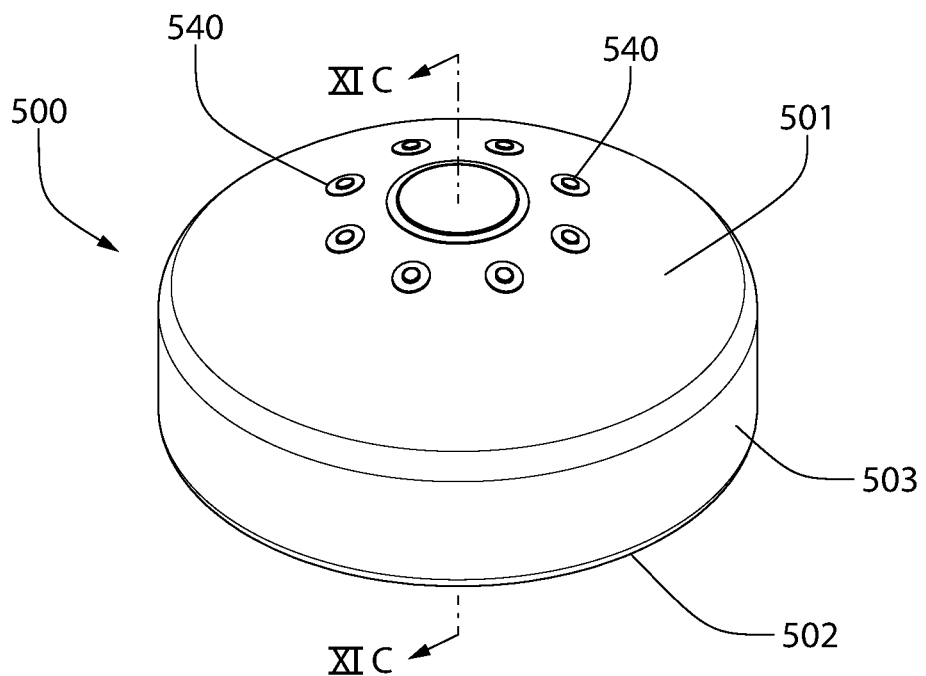
FIG. 6A is a top perspective view of an impact limiter of the system of FIG. 1 in accordance with an embodiment of the present invention.
Figure 6B:
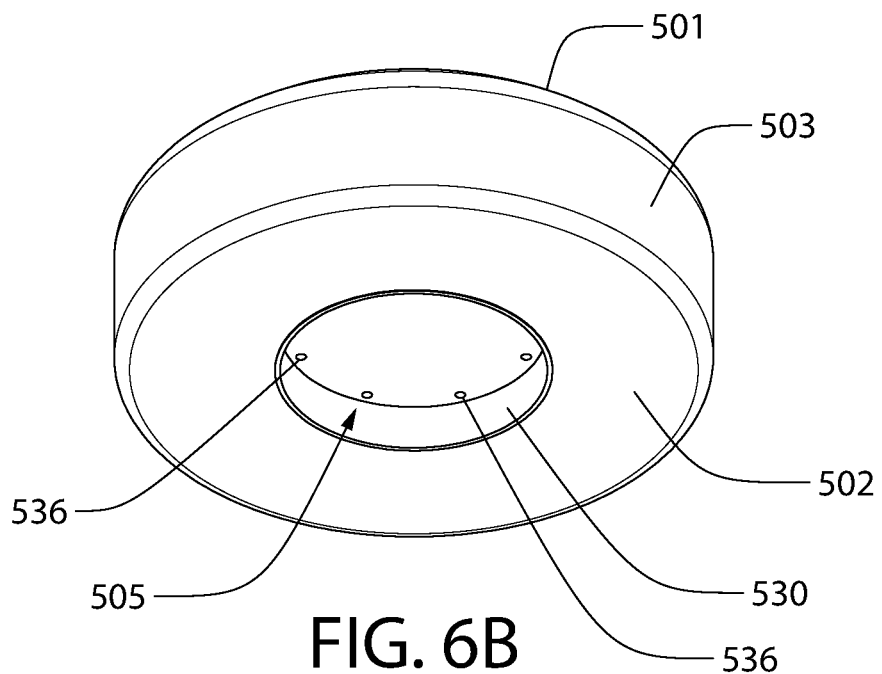
FIG. 6B is a bottom perspective view of the impact limiter of FIG. 6A.
Figure 6C:
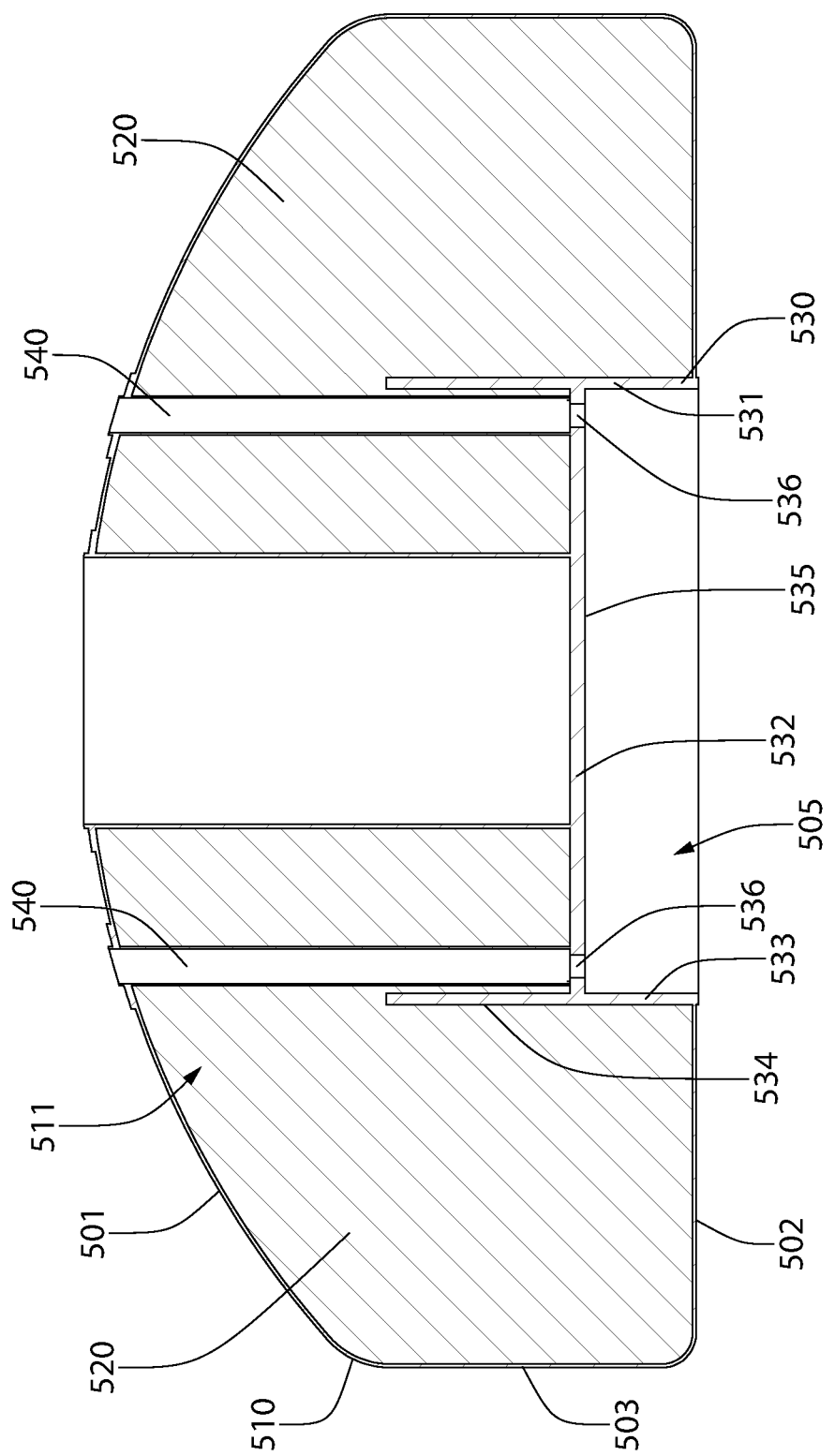
FIG. 6C is a cross-sectional area taken along line VIC-VIC of FIG. 6A

Referring to FIGS. 6A-6C, the first impact limiter 500 will be described in detail. It should be appreciated that the second impact limiter 550 may be generally identical to the first impact limiter 500, although some modifications may be required to effectuate the coupling of the second impact limiter 550 to the lower portion 220 of the vessel body 200. Furthermore some modifications to the size of the second impact limiter 550 as compared to the first impact limiter 500 may be required to facilitate the fit of the second impact limiter 550 onto the lower portion 220 of the vessel body 200 and/or for functional reasons. In some embodiments, the size, structure, components, materials, and the like of the first and second impact limiters 500, 500 may be the same.

The first impact limiter 500 may comprise a top surface 501, a bottom surface 502, and a side surface 503 extending between the top and bottom surfaces 501, 502. The bottom surface 502 may be flat/planar. The side surface 503 may be cylindrical. The top surface 501 may be domed or dome-shaped such that the top surface 503 may be curved and convex. In alternative embodiments, the top surface 501 may be flat/planar similarly to the bottom surface 502. The first impact limiter 500 may comprise a depression 505 formed into the bottom surface 502 for receiving the annular collar 211 of the vessel body 200 when the first impact limiter 500 is coupled to the vessel body 200.

The first impact limiter 500 may comprise a shell 510 that defines an internal cavity 511. The internal cavity 511 may be filled, at least partially, with an energy absorbing material 520. The energy absorbing material 520 may be a material that is crushable to dissipate external impact forces which might be caused by an end drop of the containment vessel 100 (i.e., a vertical drop on an end of the containment vessel 100 or at a slight oblique angle thereto). The energy absorbing material 520 may be a suitable preferably fire-resistant energy absorbing substance or structural assemblage. In one embodiment, the energy absorbing material 520 may comprise fire-resistant polyurethane or a similar pliable material with the ability to absorb large amounts of kinetic energy when undergoing large deformation. In another embodiment, the energy absorbing material 520 may be a crushable polymeric foam material of suitable density (e.g. polyethylene, etc.). In one embodiment, the energy absorbing material 520 may fill the internal cavity 511.

The shell 510 of the first impact limiter 500 may be formed of a corrosion-resistant alloy. The corrosion-resistant alloy may be a suitable metal, such as for example without limitation stainless steel. Thus, the shell 510 may form a body portion of the impact limiter 500 that comprises a metal enclosure that is filled with the energy absorbing material 520. Other metal materials including suitable gauge aluminum or other can be used. The shell 510 may provide a protective outer skin that encloses the energy absorbing material 520 at the outboard ends of the impact limiter 500 which shields the energy absorbing material 520 from minor damage, fire, and weather during transport and handling.

The first impact limiter 500 may comprise a bracket member 530. The bracket member 530 may be integral with the shell 510 in some embodiments. In the exemplified embodiment, the bracket member 530 may be formed separately from the shell 510 and affixed thereto 510 such as via welding or the like. The bracket member 530 may have an H-shaped cross-sectional area, as shown in FIG. 6C. The bracket member 530 may be formed from a rigid material, such as a metal. The bracket member 530 may comprise an annular sidewall 531 and a horizontal plate portion 532. The annular sidewall 531 may comprise a lower sidewall portion 533 extending downwardly relative to the horizontal plate portion 532 and an upper sidewall portion 534 extending upwardly relative to the horizontal plate portion 532. Thus, the horizontal plate portion 532 may divide the annular sidewall 531 into the upper and lower sidewall portions 533, 534. The lower sidewall portion 533 and a bottom surface 535 of the horizontal plate portion 532 may define the depression 505 in the bottom surface 502. The upper sidewall portion 534 may extend into the internal cavity 511 of the shell 510. The upper sidewall portion 534 may be in contact with the energy absorbing material 520 located within the internal cavity 511 of the shell 510.

The lower sidewall portion 533 of the bracket member 530 and the horizontal plate portion 532 of the bracket member 530 may form a portion of a boundary of the internal cavity 511. That is, the shell 510 may be open to the internal cavity 511 along the depression 505. The lower sidewall portion 533 of the annular sidewall 531 and the horizontal plate portion 532 may collectively close the open portions of the shell 510 along the depression 505. Thus, the internal cavity 511 may be filled with the energy absorbing material 520 via the opening formed along the depression 505, and then the opening may be closed by welding or otherwise attaching the bracket member 530 to the shell 510. In some embodiments, the shell 510 may extend along the sides of the depression 505 but not along the floor of the depression 505. In such embodiments, the bracket member 530 may include the horizontal plate portion 532 to form the floor of the depression 505 and the upper sidewall portion 534, but in such embodiments the lower sidewall portion 534 of the bracket member 530 may be omitted.

The horizontal plate portion 532 of the bracket member 530 may comprise a plurality of fastener holes 536 for receiving fasteners used to couple the impact limiter 500 to the containment vessel 100. In the exemplified embodiment, the fastener holes 536 are arranged in a spaced apart manner along a ring. Each of the fastener holes 536 extends through the thickness of the horizontal plate portion 532 from the top surface thereof to the bottom surface 535 thereof.

The first impact limiter 500 may comprise a plurality of passageways or through-holes 540 that extend from the top surface 501 to the horizontal plate portion 532 of the bracket member 530. Stated another way, each of the passageways 540 may extend from a top opening in the top surface 501 of the first impact limiter 500 to a bottom opening in the floor of the depression 505. Each of the passageways 540 may be aligned with one of the fastener holes 536 in the horizontal plate portion 532 of the bracket member 530. The first impact limiter 500 may be coupled to the containment vessel 100 by inserting a fastener (i.e., a bolt) through the passageway 540 and into and through one of the fastener holes 536. The portion of the fastener that extends through the fastener hole 536 may then extend into a fastener receiving hole of the containment vessel 100, as described in more detail below.

Figure 2:
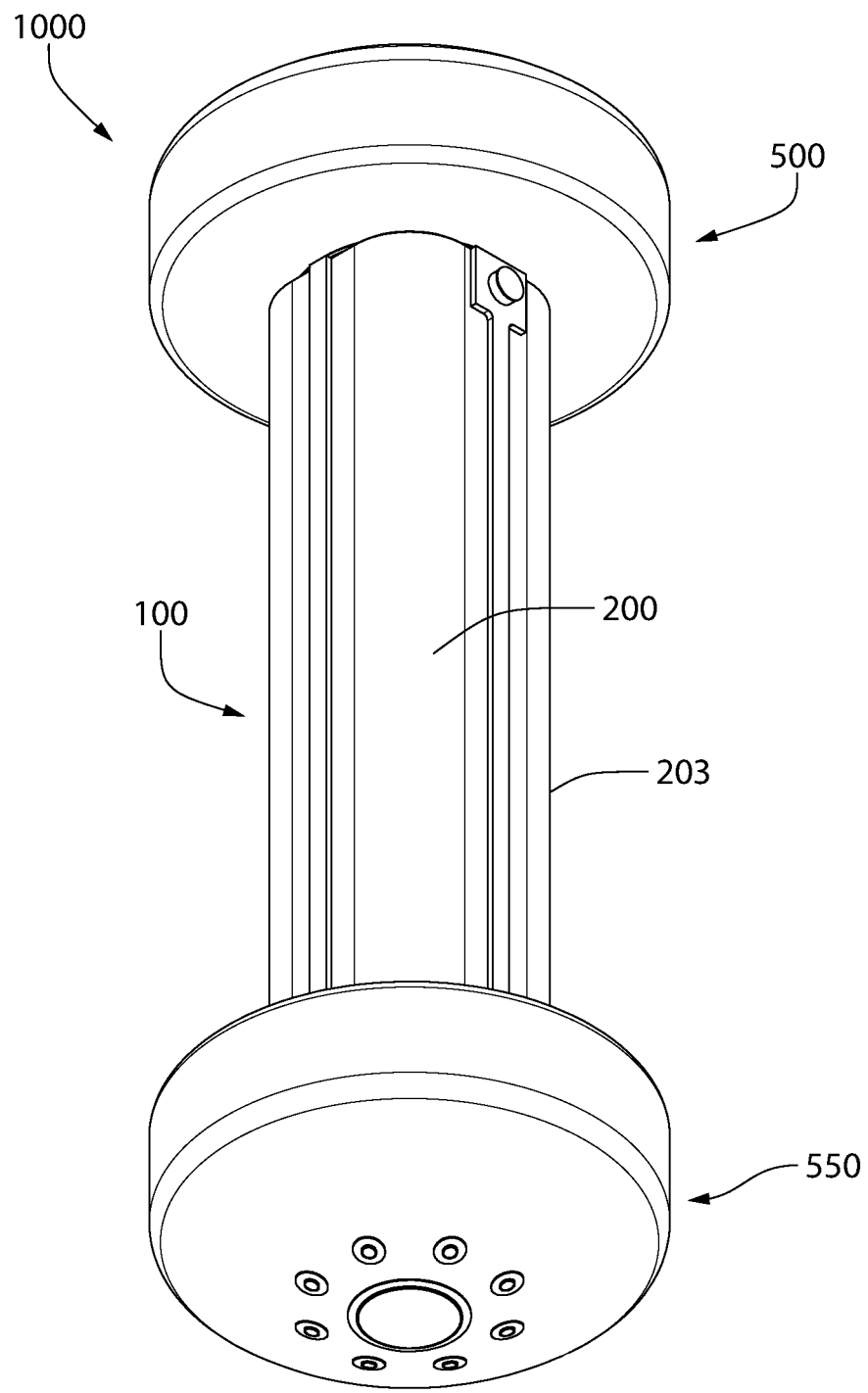
FIG. 2 is a bottom perspective view of the system of FIG. 1.
Figure 3:
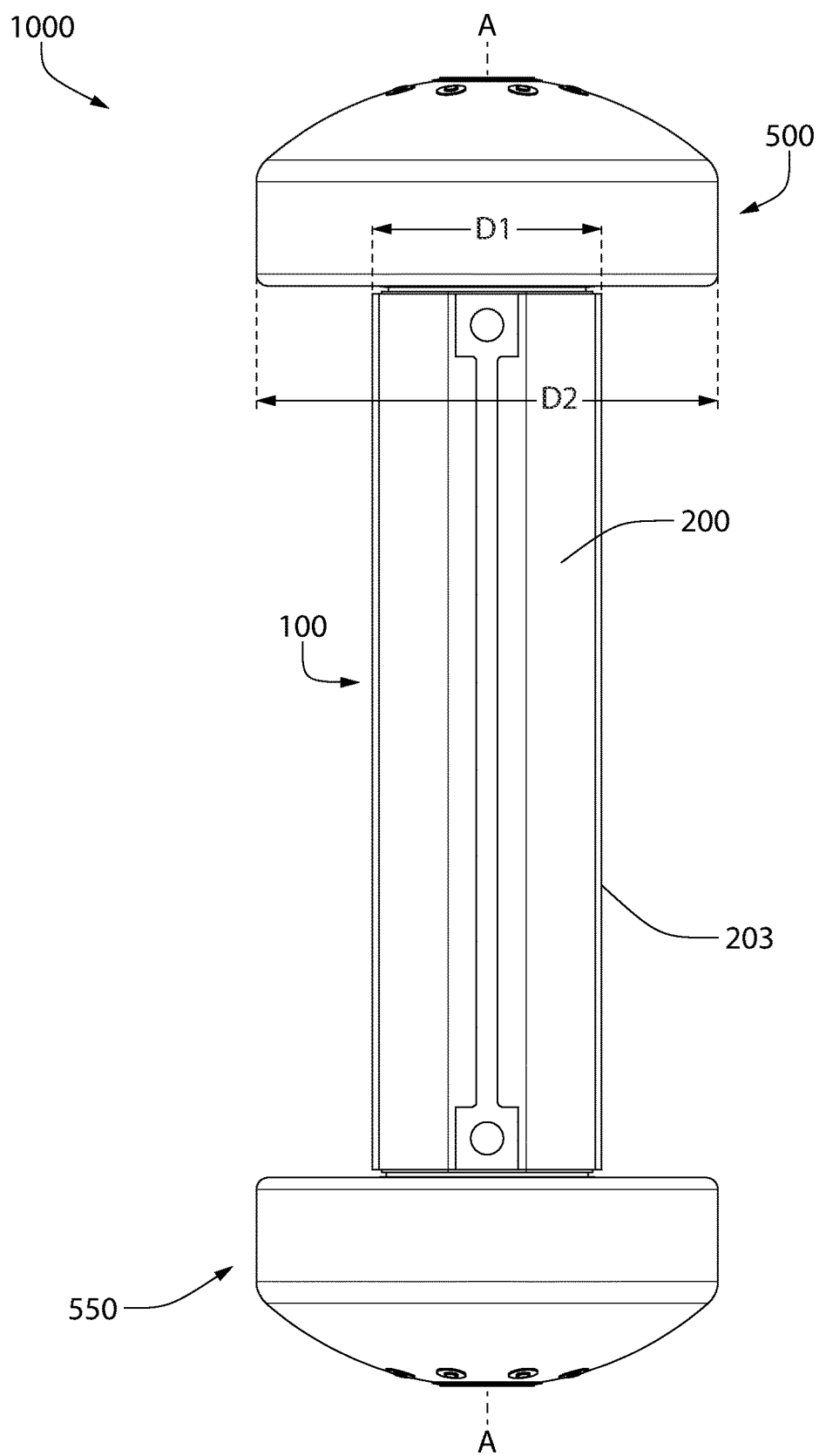
FIG. 3 is a front view of the system of FIG. 1.
Figure 4:
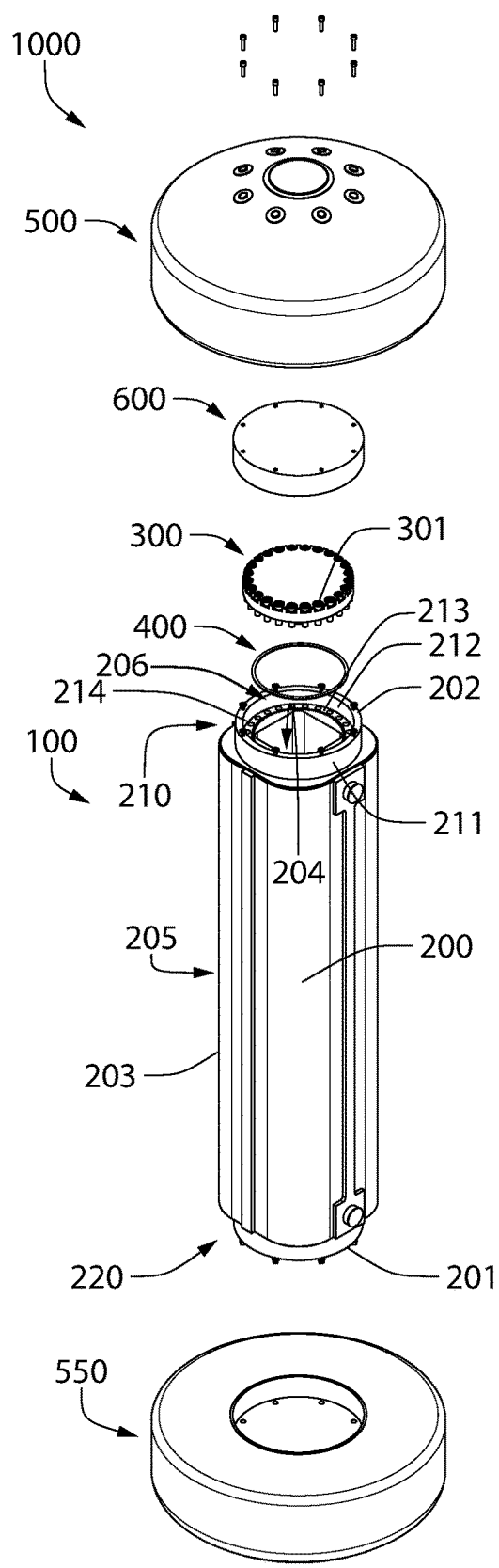
FIG. 4 is an exploded top perspective view of the system of FIG. 1.
Figure 5:
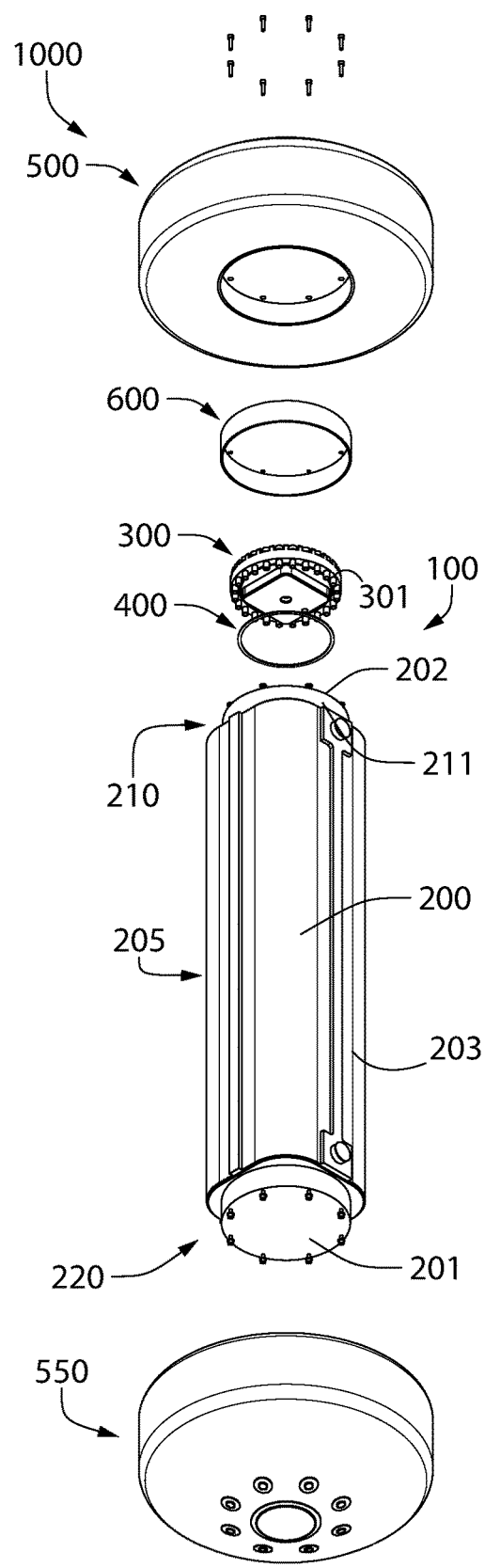
FIG. 5 is an exploded bottom perspective view of the system of FIG. 1.

As best seen in FIG. 2, when the impact limiters 500, 550 are coupled to the containment vessel 100, the impact limiters 500, 550 have an outside diameter D2 which is larger than an outside diameter D1 of the containment vessel 100. Accordingly, the impact limiters are configured to each protrude radially outward beyond the vessel body 200 to protect the vessel body 200 if dropped. The deformable impact limiters 500, 550, and not the containment vessel 100 (and specifically the vessel body 200 thereof), will first strike the impact surface (e.g. ground or concrete slab generally) to absorb and dissipate the impact force or kinetic energy of a fall.

The system 1000 described herein for transporting radioactive materials includes the containment vessel 100 formed from metal with two impact limiters 500, 550 fastened to the upper and lower extremities of the containment vessel 100. The containment vessel 100 may include the vessel body 200, which may be thick-walled and may include an integral baseplate welded to the thick-walled cylinder which in turn is welded to a heavy flange. The lid 300 may be coupled to a top end of the vessel body 200 to close the top end of the storage cavity 204 of the containment vessel 100. The only access to the storage cavity 204 of the containment vessel 200 may be through a bolted joint between a top flange of the containment vessel 200 and the lid 300. The lid seal 400 may provide sequestration of radionuclides in the storage cavity 204. The inner seal formed by the lid seal 400 may be referred to as the containment seal and the outer seal may be referred to as the test seal. To qualify under 10 CFR Part 71 regulations, a transport package (such as the system 1000 described herein) must be shown to maintain the integrity of the containment seal (lid seal 400 or gasket) which is essential to ensure complete isolation of the contents (radioactive gases and particulates) from the ambient under all normal and accident conditions. Possible accident conditions, recited in the governing USNRC regulations which can be found in 10 CFR 71.73, include the following four sequential events.

1. Free drop from a height of 30 feet on to an essentially rigid surface in the most vulnerable strike orientation.
2. Drop onto a 6-inch diameter mild steel bar resulting in a potential damage to the containment vessel's "containment boundary."
3. An all-enveloping fire around the transport package for a period of 30 minutes.
4. Complete submersion in a body of water.

The relevant verbiage from 10 CFR 71.73 on the hypothetical accidents is reproduced below for completeness (the tests refer to a scale model of the package):

1. Free Drop. A free drop of the specimen through a distance of 9 m (30 ft) onto a flat, essentially unyielding, horizontal surface, striking the surface in a position for which maximum damage is expected.
2. Puncture. A free drop of the specimen through a distance of 1 m (40 in) in a position for which maximum damage is expected, onto the upper end of a solid, vertical, cylindrical, mild steel bar mounted on an essentially unyielding, horizontal surface. The bar must be 15 cm (6 in) in diameter, with the top horizontal and its edge rounded to a radius of not more than 6 mm (0.25 in), and of a length as to cause maximum damage to the package, but not less than 20 cm (8 in) long. The long axis of the bar must be vertical.
3. Thermal. Exposure of the specimen fully engulfed, except for a simple support system, in a hydrocarbon fuel/air fire of sufficient extent, and in sufficiently quiescent ambient conditions, to provide an average emissivity coefficient of at least 0.9, with an average flame temperature of at least 800° C. (1475° F.) for a period of 30 minutes, or any other thermal test that provides the equivalent total heat input to the package and which provides a time averaged environmental temperature of 800° C. The fuel source must extend horizontally at least 1 m (40 in) but may not extend more than 3 m (10 ft), beyond any external surface of the specimen, and the specimen must be positioned 1 m (40 in) above the surface of the fuel source. For purposes of calculation, the surface absorptivity coefficient must be either that value which the package may be expected to possess if exposed to the fire specified or 0.8, whichever is greater; and the convective coefficient must be that value which may be demonstrated to exist if the package were exposed to the fire specified. Artificial cooling may not be applied after cessation of external heat input, and any combustion of materials of construction, must be allowed to proceed until it terminates naturally.
4. Immersion. For fissile material subject to § 71.55, in those cases where water in leakage has not been assumed for criticality analysis, immersion under a head of water of at least 0.9 m (3 ft) in the attitude for which maximum leakage is expected.

Accident scenarios corresponding to the four hypothetical accidents described above will now be described.

Accident #1: The first postulated accident in the series of the four listed above is the so-called "free drop" accident which posits a free fall of the loaded containment vessel from a height of 9 meters onto an essentially rigid surface. The structural requirement is to ensure that the cladding of the nuclear fuel (the tube that encloses the fuel pellets) stored inside the containment vessel will not rupture due to the high inertia loads produced by the impact. The function of the impact limiters is to ensure that the maximum g-load sustained by the impact is sufficiently low to keep the fuel cladding from rupturing.

Accident #2: Rupture from impact of a penetrant rod that also challenges the structural capacity of the containment vessel which must be sufficiently robust to remain un-breached by the penetrant rod.

Accident #3: Enveloping fire challenges the integrity of the seals that sequester the fuel inside the storage cavity. These seals (such as the lid seal 400) are typically made of a polymeric material which are known to provide a reliable barrier to leakage of the containment vessel's contents unless their temperature is elevated beyond their rated temperature by a fire event.

Accident #4. The water submersion case seeks to ensure that the seals (such as the lid seal 400) have remained effective after sustaining the previous accidents so that no intrusion of water in the fuel storage space would occur. (Water intrusion is unacceptable because it has the unsalutary effect of raising the reactivity of the stored fuel).

The invention described herein seeks to protect the seals, such as the lid seal 400, from experiencing elevated temperatures beyond their rated range during or after a design basis fire event such as described above. Some design features of the impact limiters 500, 550 used as part of the system for transporting radioactive materials 1000, as described above, include the following.

A plate and shell type shell of revolution that forms the impact limiter enclosure is equipped with an integral skirt that fits over the barrel of the containment vessel at its two extremities. The material of the enclosure may be corrosion-resistant alloy such as stainless steel.

The external profile of the impact limiter 500, 500 may be in the form of a dished (or domed) head as shown in the figures or cylindrical with a flat ends, or any other substantially axially symmetric shape.

The outer diameter of the impact limiter 500, 550 is preferably set such that during a lateral drop event, the crush material locks up before the side wall of the containment vessel 100 impacts the target.

The inside space of the enclosure may be filled with a fire-resistant polyurethane or similar pliable material with the ability to absorb large amounts of kinetic energy when undergoing large deformation.

A number of bolts may be enclosed in the passageway 540, as shown and described with reference to FIG. 6C. The passageway 540 may be tubular. The bolts may provide the connection between the impact limiter 500, 550 and the containment vessel 100. The bolts may connect the impact limiter 500, 550 to the vessel body 200 or to the lid 300 in different embodiments. The bolts may be tension-only members by virtue of their placement configuration and thus their function may be limited to keeping the impact limiter 500, 550 from detaching itself from the containment vessel 100.

The impact limiters 500, 550 as described herein may conform with the above features and may be best configured to meet accident condition #1 described above. However, the puncture accident scenario may threaten the integrity of the thin skin (i.e., the shell 510) of the impact limiter 500, 550, which may result in exposure of the crush material (i.e., the energy absorbing material 520) during a possible subsequent fire event. With the crush material exposed, the fire event may threaten the crush material's physical integrity, including polyurethane crush material which can catch fire. Even aluminum honeycomb material, widely used in the industry, runs the risk of its glue or brazing being damaged from excessive exposure to heat. Another risk is that of overheating of the seals (such as the lid seal 400) that lie right under the lid 300. The lid seal 400, while very effective in providing reliable containment in moderate temperatures, may become ineffective at elevated temperatures. This limitation of the lid seal 400 may be overcome by utilizing the thermal shield 600, mentioned above and described in greater detail below.

Figure 7A:
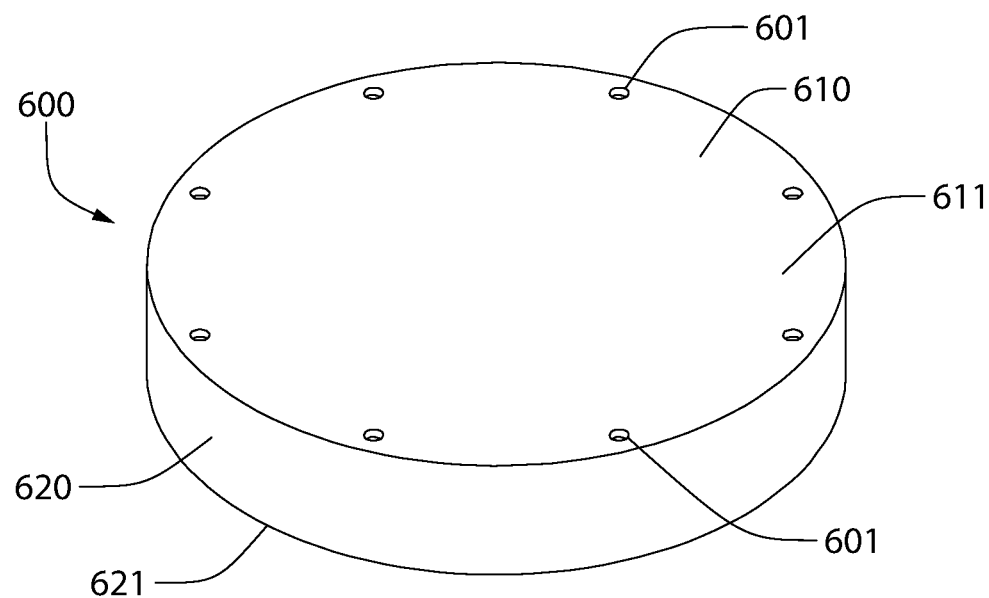
FIG. 7A is a top perspective view of a thermal shield of the system of FIG. 1 in accordance with an embodiment of the present invention.
Figure 7B:
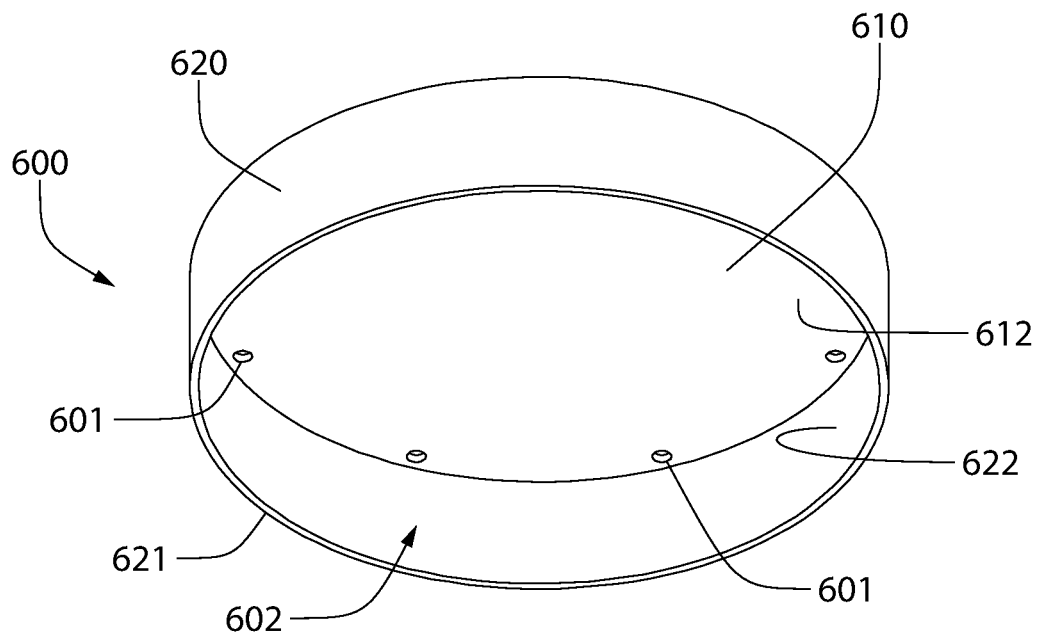
FIG. 7B is a bottom perspective view of the thermal shield of FIG. 7A.

Referring to FIGS. 7A and 7B, the thermal shield 600 will be described in accordance with an embodiment of the present invention. The thermal shield 600 generally comprises a top plate 610 having a top surface 611 and a bottom surface 612 and an annular skirt 620 extending downwardly from the bottom surface 612 of the top plate 610. The annular skirt 620 extends downwardly from the bottom surface 612 of the top plate 610 along an outer edge of the top plate 610. The annular skirt 620 terminates in an annular distal end 621. The annular skirt 620 comprises an inner surface 622 and an outer surface 623 that is opposite the inner surface 622. The inner surface 622 of the annular skirt 620 and the bottom surface 612 of the top plate 610 collectively define a thermal shield cavity 602, whereby the inner surface 622 of the annular skirt 620 forms the sidewall boundary of the thermal shield cavity 602 and the bottom surface 612 of the top plate 610 forms the floor (or roof depending on orientation) of the thermal shield cavity 602. Thus, the thermal shield 600 may be in the shape of an inverted cup.

The thermal shield 600 comprises a plurality of fastener holes 601 that extend through the top plate 610 from the top surface 611 to the bottom surface 612. The fastener holes 601 are positioned in a spaced apart manner in a circular arrangement. The exact number, spacing, and positioning of the fastener holes 601 is not to be limiting of the invention in all embodiments. The fastener holes 601 may be configured to receive a fastener, such as a bolt, a screw, or the like, to facilitate the attachment of the thermal shield 600 to the containment vessel 100, as described in more detail below. The fastener holes 601 may be spaced and positioned in the same manner as the fastener holes 536 of the first impact limiter 500 so that the same fastener/bolt may be used to couple the first impact limiter 500 and the thermal shield 600 to the containment vessel 100, as described in more detail below with reference to FIGS. 8-10.

The thermal shield 600 may be formed from any high temperature resistant, low heat conductivity and corrosion resistant alloy. In one embodiment, the thermal shield 600 may be formed from austenitic stainless steel. In one embodiment, the thermal shield 600 may comprise a polished surface, although this may not be required in all embodiments. Specifically, the outer surface of the thermal shield 600 may be a polished surface. Forming the thermal shield 600 with polished or shiny surfaces may minimize radiative heat through the thermal shield 600 and into the containment vessel 100. The outer surface of the thermal shield 600, which is formed by the outer surface 622 of the annular skirt 620 and the top surface 611 of the top plate 610, may have an emissivity coefficient of 0.2 or less. In another embodiment, the outer surface of the thermal shield 600 may have an emissivity coefficient of 0.1 or less.

In some embodiments, the thermal shield is formed from a material having a thermal conductivity of about 30 Watts/(Meter×Kelvin), or less. In some embodiments, the thermal shield is formed from a material having a thermal conductivity of about 20 Watts/(Meter×Kelvin), or less. In some embodiments, the thermal shield may be formed from a material having a thermal conductivity of between about 10 Watts/(Meter×Kelvin) and about 40 Watts/(Meter×Kelvin), more specifically between about 10 Watts/(Meter×Kelvin) and about 30 Watts/(Meter×Kelvin), more specifically between about 12 Watts/(Meter×Kelvin) and about 25 Watts/(Meter×Kelvin), and still more specifically between about 15 Watts/(Meter×Kelvin) and about 21 Watts/(Meter×Kelvin). The term "about" as used herein allows for a variation of plus/minus 5%.

The thermal shield 600 may have an effective thermal conductivity. When the thermal shield 600 comprises a single layer, the effective thermal conductivity may be the thermal conductivity of that single layer. When the thermal shield 600 comprises multiple layers, the effective thermal conductivity may be a mean thermal value of all of the various layers. That is, if the thermal shield 600 is a laminate structure, the effective thermal conductivity may take into consideration the thermal conductivity of each of the layers. In some embodiments, when moving normally from an outer surface of the thermal shield 600 to an inner surface of the thermal shield 600, the thermal shield 600 may have an effective thermal conductivity of about 3 Watts/(Meter×Kelvin), or less. In some embodiments, the thermal shield 600 may have an effective thermal conductivity of about 1 Watt/(Meter×Kelvin), or less. In some embodiments, the thermal shield 600 may have an effective thermal conductivity of about 0.75 Watts/(Meter×Kelvin), or less. The term "about" as used herein allows for a variation of plus/minus 5%. In some embodiments, it may be the top plate 610 of the thermal shield 600 that has the effective thermal conductivity within the ranges noted above.

In some embodiments the shell 510 of the impact limiter 500 and the thermal shield 600 may be formed from the same material, for example stainless steel material. However, this is not required in all embodiments. In some embodiments the shell 510 of the impact limiter 500 and the thermal shield 600 may both be formed from stainless steel, although they may have different surface finishes (for example, the thermal shield 600 may be polished and the shell 510 of the impact limiter 500 may not be polished).

Referring to FIGS. 8-10, the system 1000 will be further described, with specific discussion of the relative positioning of the various components and parts of the system 1000 previously described. The vessel body 200 comprises the upper portion 210 which includes an second end or top end 202 of the vessel body 200 and the lower portion 220 which includes a first end or lower end 201 of the vessel body 200. The second impact limiter 550 is coupled to the lower end 201 of the vessel body 200. The second impact limiter 550 comprises a body portion 551 having a top surface 552 and a depression 553 formed into the top surface 552. The lower end of the vessel body 200 may be located within the depression 553 of the second impact limiter 550 when the second impact limiter 550 is coupled to the vessel body 200.

As noted previously but perhaps best shown in FIGS. 9 and 10, the upper portion 210 of the vessel body 200 comprises the seal seat 213 and the annular collar 211 that collectively define the entry passageway 206 that forms a passageway into the storage cavity 204. The lid 300 is positioned within the entry passageway 206. The lid 300 may include a lower portion 310 that nests within the storage cavity 204 below the entry passageway 206 and an upper portion 320 that nests within the entry passageway 206. The upper portion 320 may comprise a downwardly facing shoulder 321 that extends radially outwardly from the lower portion 310. The downwardly facing shoulder 321 may be considered to form part of the bottom surface of the lid 300. The downwardly facing shoulder 321 may rest atop of the seal seat 213 of the upper portion 210 of the vessel body 200 when the lid 300 is positioned within the entry passageway 206.

The lid seal 400 may be located between the downwardly facing shoulder 321 and the seal seat 213 to hermetically seal the top end of the storage cavity 204. The lid seal 400 may be compressed between the lid 300 and the seal seat 213 of the vessel body 200. This compression of the lid seal 400 may be achieved solely due to the weight of the lid 300 as the lid 300 rests atop of the lid seal 400 and/or may be achieved when the lid 300 is coupled to the vessel body 200 with fasteners, as described below.

The lid 300 may be coupled to the vessel body 200 with fasteners 315 that extend into the holes 301 in the lid 300 and into the holes 214 in the seal seat 213. The fasteners 315 may be bolts as previously described or other types of fasteners including screws, rivets, rods, threaded rods, or the like. The fasteners 315 and the holes 301 and the holes 214 may be located radially outward of the location of the lid seal 400 to prevent radiation from emitting from the storage cavity 204 and through the holes 301, 214.

The thermal shield 600 may be positioned atop of the lid 300. Specifically, the thermal shield 600 may be positioned so that the top plate 610 of the thermal shield 600 covers the lid 300 and the annular skirt 620 of the thermal shield 600 extends downwardly along an outer surface of the annular collar 211 of the vessel body 200. A small gap or space may exist between the annular skirt 620 of the thermal shield 600 and the outer surface of the annular collar 211 of the vessel body 200, as best shown in FIG. 10. In alternative embodiments, a tight fit may exist between the annular skirt 620 and the annular collar 211 so that the gap is reduced or eliminated.

The thermal shield 600 may fully cover the lid 300 so that no portion of the lid 300 is exposed when the thermal shield 600 is positioned thereon or when the thermal shield 600 is coupled to the vessel body 200. In the embodiment shown in FIGS. 8-10, the thermal shield 600 is positioned over the annular collar 211 of the vessel body 210 so that the top plate 610 of the thermal shield 600 is atop of the distal end of the annular collar 211 and the lid 300 and the annular skirt 620 circumscribes at least a portion of the annular collar 211. The top plate 610 of the thermal shield 600 may overlie an entirety of the lid 300. As used herein, the term overlie does not require direct contact between the top plate 610 of the thermal shield 600 and the lid 300, but requires the top plate 610 of the thermal shield 600 to extend over and cover the lid 300, which can be achieved regardless of whether the top plate 610 of the thermal shield 600 directly contacts the lid 300 or not.

The top plate 610 of the thermal shield 600 may be in direct contact with the top surface of the lid 300 in some embodiments, although there may be a gap between the top plate 610 of the thermal shield 600 and the top surface of the lid 300 in other embodiments, examples of which will be described herein below. Furthermore, while in the exemplified embodiment the inner surface 622 of the annular skirt 620 of the thermal shield 600 may be in contact with the outer surface of the annular collar 211 of the vessel body 200, in other embodiments there may be a space or gap between the inner surface 622 of the annular skirt 620 and the outer surface of the annular collar 211.

As noted above, the thermal shield 600 comprises the top plate 610 and the annular skirt 620 that collectively define the thermal shield cavity 602. When the thermal shield 600 is positioned over the lid 300 and coupled to the containment vessel 100, at least a portion of the annular collar 211 of the vessel body 200, at least a portion of the lid 300, and the lid seal 400 are located within the thermal shield cavity 602. Thus, a plane B-B oriented perpendicular to the longitudinal axis A-A that intersects the lid seal 400 will also intersect the annular skirt 620 of the thermal shield 600. The plane B-B also intersects the lid 300 and the annular collar 211 of the vessel body 200. Stated another way, the thermal shield cavity 602 may be defined between the bottom surface 612 of the top plate 610 of the thermal shield 600 and a plane on which the distal end 621 of the annular skirt 620 lies. As shown in FIGS. 9 and 10, the lid seal 400 is located within the thermal shield cavity 602 so defined. By positioning the lid seal 400 within the thermal shield cavity 602, the thermal shield 600 is able to reduce the amount of heat that is able to reach the lid seal 400 from the exterior of the containment vessel 100 during a fire situation or a design basis fire event, such as described above. This can help to preserve the integrity of the lid seal 400 even when the system 1000 is fully engulfed in flames, which can prevent liquid from penetrating into the storage cavity 204 during a later water immersion event (or while trying to put out the flames of the fire) and also prevent radiation from being emitted from the storage cavity 204.

The first impact limiter 500 is positioned over the thermal shield 600 and coupled to the containment vessel 100 so that the thermal shield 600 is located between the first impact limiter 500 and the containment vessel 100. More specifically, the thermal shield 600 may be located between the first impact limiter 500 and the lid 300. The top plate 610 of the thermal shield 600 may be located within the depression 505 of the first impact limiter 500. Furthermore, at least a portion of the annular skirt 620 of the thermal shield 600 may be located within the depression 505 of the first impact limiter 500 when the first impact limiter 500 is coupled to the containment vessel 100. In some embodiments, a distal portion of the annular skirt 620 may extend past the bottom surface 502 of the first impact limiter 500 so that the distal portion of the annular skirt 620 may not be located within the depression 550 of the first impact limiter 500. In other embodiments the distal end 621 of the annular skirt 620 may be recessed within the depression 505 of the first impact limiter 500.

The first impact limiter 500 may be coupled to the containment vessel 100 with fasteners 508. The fasteners 508 may be inserted into the passageways 540 of the first impact limiter 500 until the heads of the fasteners 508 abut against the horizontal plate portion 532 of the bracket member 530, thereby preventing the fasteners 508 from moving further axially in the direction of the containment vessel 100. When so positioned, shank portions of the fasteners 508 extend into and through the fastener holes 536 in the horizontal plate portion 532 and into a fastener receiving hole 218 that is formed in the distal end of the annular collar 211 of the vessel body 200 to securely couple the first impact limiter 500 to the vessel body 200. In the exemplified embodiment, the first impact limiter 500 is coupled directly to the vessel body 200 via the fasteners 518. In other embodiments, the fasteners holes 536 may align with the lid 300 which may include the fastener receiving holes 218 so that the first impact limiter 500 may be coupled to the lid 300 with the fasteners 218, with the lid 300 in turn being coupled to the vessel body 200 with the fasteners 315.

As noted above, the thermal shield 600 is positioned between the first impact limiter 500 and the vessel body 200. Furthermore, the thermal shield 600 includes the fasteners holes 601, which are aligned with the fastener holes 536 in the bracket member 530 of the first impact limiter 500 and with the fastener receiving holes 218 in the containment vessel 100. Thus, the fasteners 518 may extend through the fastener holes 536 in the bracket member 530, through the fastener holes 601 in the thermal shield 600, and into the fastener receiving holes 218. As such, the same fasteners 518 may be used to couple the first impact limiter 500 and the thermal shield 600 to the containment vessel 100.

Figure 11:
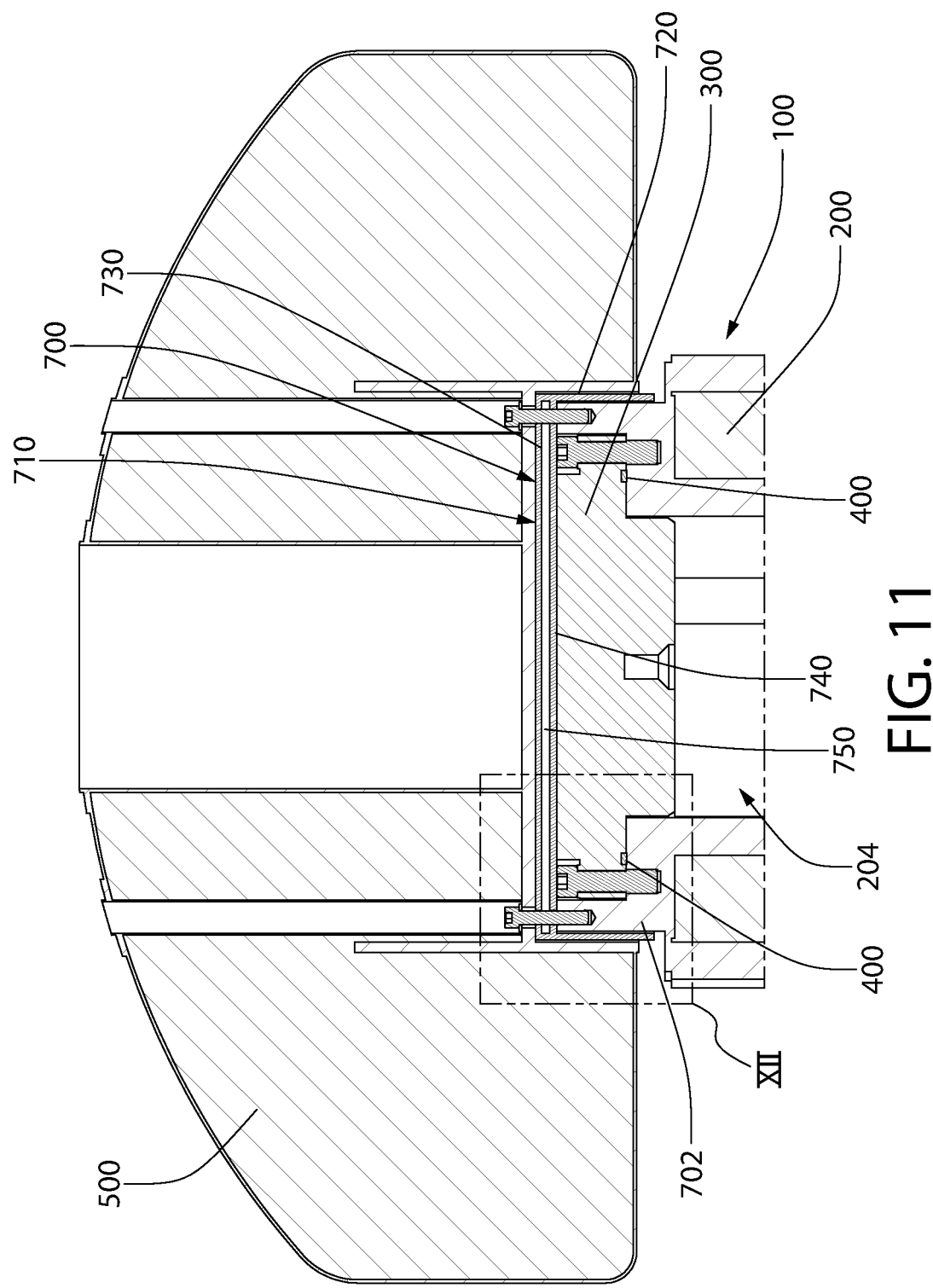
FIG. 11 is a close-up view of area IX of FIG. 8 in accordance with an alternative embodiment of the present invention.
Figure 12:
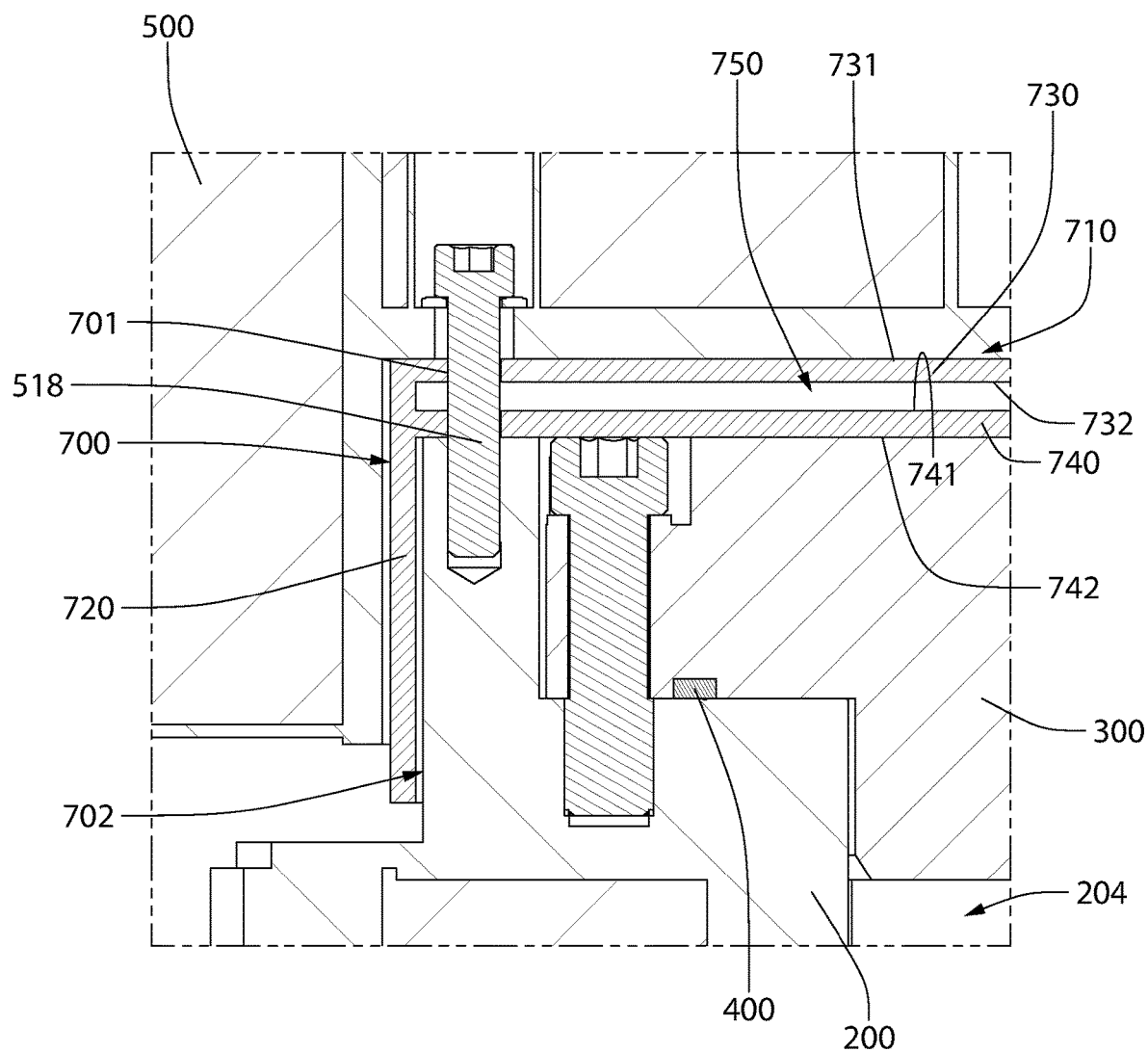
FIG. 12 is a close-up view of area XII of FIG. 11.

Referring to FIGS. 11 and 12, a portion of a system for transporting radioactive materials 1100 is illustrated in accordance with an alternative embodiment of the present invention. The system 1100 is identical to the system 1000 except for the differences specifically mentioned herein. In particular, the system 1100 comprises the containment vessel 100 which includes the vessel body 200, the lid 300, and the lid seal 400, all of which are identical to those components as described above with reference to the system 1000. Furthermore, the system 1100 includes a first impact limiter 500 and a second impact limiter 550. Although the second impact limiter 550 is not shown in FIGS. 11 and 12, it should be understood that the portion of the system 1100 which is not illustrated in FIGS. 11 and 12 is identical to the same portion of the system 1000 described above. Finally, the system 1100 includes a thermal shield 700. The thermal shield 700 of the system 1100 differs somewhat from the thermal shield 400 of the system 1000, as described in detail below. In this embodiment, the description of the components above with reference to FIGS. 1-10 is applicable except with regard to the specific modification to the thermal shield 700 described below. Description of the material of the thermal shield 600 may be applicable to the thermal shield 700.

The thermal shield 700 comprises a top plate 710 and an annular skirt 720 extending downward from the top plate 710 to form a thermal shield cavity 702. In this embodiment, the top plate 710 of the thermal shield 700 is a multi-layer construction. Specifically, the top plate 710 of the thermal shield 700 comprises a first layer 730 and a second layer 740. The first layer 730 comprises a top surface 731 that forms a top surface of the top plate 710 and a bottom surface 732 opposite the top surface 731. The second layer 740 comprises a top surface 741 and a bottom surface 742 opposite the top surface 741, with the bottom surface 742 of the second layer 740 forming a bottom surface of the top plate 710.

The bottom surface 732 of the first layer 730 is spaced apart from the top surface 741 of the second layer 740 by a gap 750. In the exemplified embodiment the gap 750 has a width, measured from the bottom surface 732 of the first layer 730 to the top surface 741 of the second layer 740, that is 5 mm or less. In some embodiments, the gap 750 may have a width that is no more than 4 mm, more specifically no more than 3 mm, more specifically no more than 2 mm, more specifically no more than 1 mm. In this embodiment, the gap 750 may have a constant and consistent width measured between the bottom surface 732 of the first layer 730 and the top surface 741 of the second layer 740. However, the invention is not to be so limited in all embodiments and the width of the gap 750 may vary along a length of the gap 750. In some embodiments, air may be located within the gap 750. In other embodiments, the gap 750 may be evacuated of air to further block the ingress of heat from a fire towards the vessel body 200 and outwards the lid seal 400. In still other embodiments, a substance or material that further reduces the ingress of heat towards the lid 300 and the lid seal 400 may be disposed within the gap 750. For example, an insulation material may be disposed within the gap 750. Such insulation materials may include fiberglass, wool, cotton, paper, wood cellulose, straw, foam, or the like.

As with the prior described embodiment, the containment vessel 100 includes the vessel body 200, the lid 300 coupled to the upper portion of the vessel body 200, and the lid seal 400 positioned between the lid 300 and the upper portion of the vessel body 200 to hermetically seal the top end of the storage cavity 204. The first impact limiter 500 and the thermal shield 700 are coupled to the containment vessel 100 (with fasteners as previously described) so that the thermal shield 700 is located between the first impact limiter 500 and the containment vessel 100. As such, the lid seal 400 is located within the thermal shield cavity 702. The two layer arrangement of the top plate 710 of the thermal shield 700 may more effectively block the inflow of heat (such as from a fire) towards the lid 300 and the lid seal 400 as compared to the single layer arrangement of the top plate 610 of the thermal shield 700 previously described. The air gap 750, whether evacuated or not, may further block the ingress of heat from a fire. This may serve to protect the integrity of the lid seal 400 to ensure radiation is contained within the storage cavity 204 of the vessel body 200.

In another embodiment, the annular skirt 720 may also have a multi-layer arrangement similar to the top plate 710. That is, the annular skirt 720 may also comprise first and second layers that are spaced apart by a gap which may be filled with air or evacuated of air or filled with some other substance, such as an insulation material as described above, that helps to prevent the ingress of heat towards the lid 300 and the lid seal 400.

In the exemplified embodiment, the top plate 710 comprises holes 701 for receiving the fasteners 518 that are used to couple the first impact limiter 500 and the thermal shield 700 to the containment vessel 100. In the exemplified embodiment, the holes 701 extend through the gap 750 between the first and second layers 730, 740 of the top plate 710 of the thermal shield 700. In other embodiments, the top plate 710 of the thermal shield 700 may include an outer portion that is positioned radially outward of the gap 750 and which does not include the gap 750. That is, the outer portion (which may be annular or ring-shaped, although this is not required) may be a solid region where the gap is filled in by the material of the thermal shield 700. In such embodiment, the holes 701 may be located along this outer portion of the top plate 710 so that the holes 701 are not in fluid communication with the gap 750.

Figure 13A:
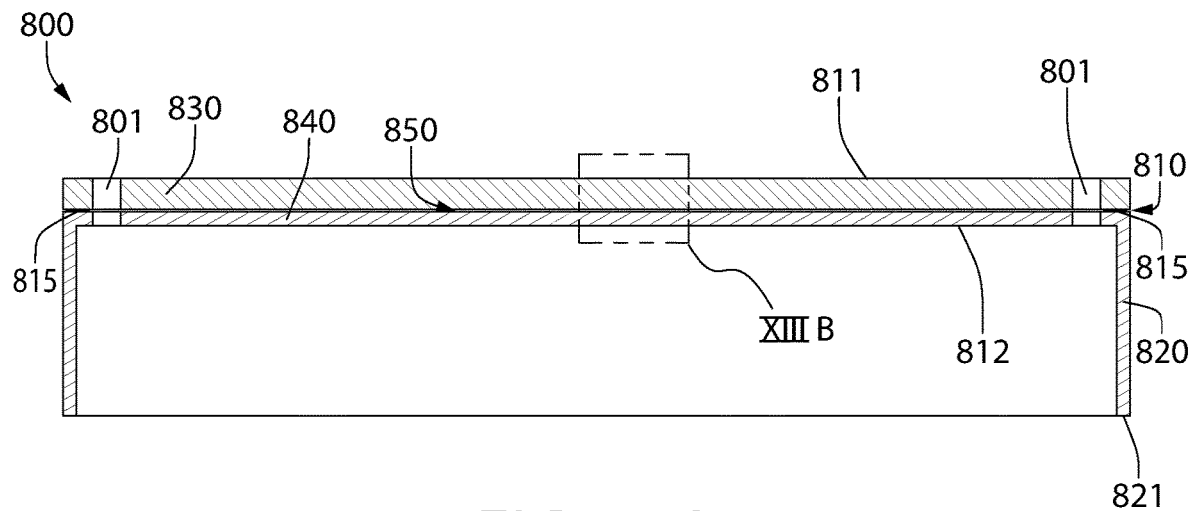
FIG. 13A is a cross-sectional view of a thermal shield in accordance with an alternative embodiment of the present invention.
Figure 13B:
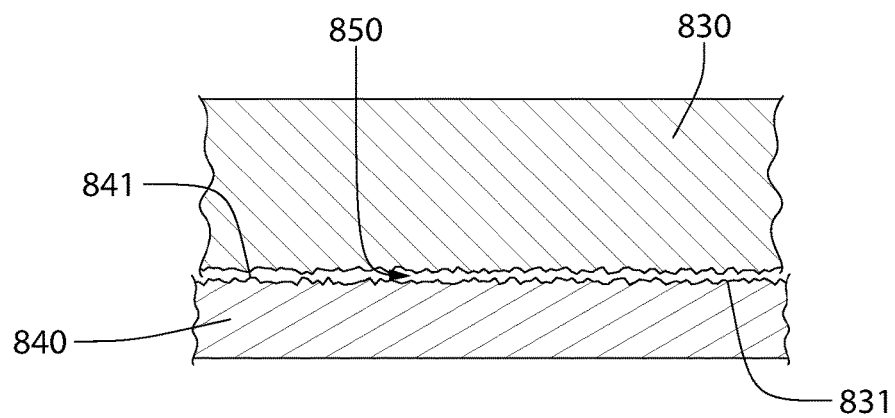
FIG. 13B is a close-up view of area XIIIB of FIG. 13A.

Referring to FIGS. 13A and 13B, a thermal shield 800 is illustrated in accordance with another embodiment of the present invention. In FIGS. 13A and 13B the thermal shield 800 is illustrated by itself. It should be appreciated that the thermal shield 800 can be used in place of the thermal shield 600 or the thermal shield 700 and is configured to be positioned in the same manner as the thermal shields 600, 700 described above. Thus, the interaction between the thermal shield 800 and the containment vessel 100 and between the thermal shield 800 and the first impact limiter 500 is the same as that described above with reference to the thermal shields 600, 700.

The thermal shield 800 comprises a top plate 810 having a top surface 811 and a bottom surface 812 and an annular skirt 820 extending downwardly from the bottom surface 812 of the top plate 810 to a distal end 821 of the annular skirt 820. The annular skirt 820 may extend from the top plate 810 along a peripheral edge of the top plate 810. The top plate 810 may be a multi-layer construction. Specifically, the top plate 810 may comprise a first layer 830 and a second layer 840, similar to the construction of the top plate 710 of the thermal shield 700. The first layer 830 may have a bottom surface 831 and the second layer 840 may have a top surface 841, with the top surface 841 of the second layer 840 being adjacent to the bottom surface 831 of the first layer 830. The first and second layers 830, 840 may be welded together by a weld joint 815. The weld joint 815 may be an annular weld joint At least a portion of the bottom surface 831 of the first layer 830 may be spaced apart from at least a portion of the top surface 841 of the second layer 840 by a gap 850.

While in this embodiment there exists the gap 850 between the first and second layers 830, 840 similar to the thermal shield 700, in this embodiment the gap 850 may not have a consistent or constant width measured between the bottom surface 831 of the first layer 830 of the top plate 810 and the top surface 841 of the second layer 840 of the top plate 810. Rather, the width of the gap may vary. In this embodiment, the first and second layers 830, 840 of the top plate 810 of the thermal shield 800 may not be in conformal surface contact, and this non-conformal surface contact may create the gap 850.

The non-conformal surface contact between the first and second layers 830, 840 may occur or be achieved in several ways. In one embodiment, the bottom surface 831 of the first layer 830 and/or the top surface 841 of the second layer 840 may not be perfectly planar. The first and second layers 830, 840 may only be welded together along an annular peripheral portion thereof. As a result, the bottom surface 831 of the first layer 830 and the top surface 841 of the second layer 840 may contact one another in some regions but not in others, and in the regions where they do not contact the gap 850 will exist. In other embodiments, one or both of the bottom surface 831 of the first layer 830 and/or the top surface 841 of the second layer 840 may be roughened to create the gap 850 when the first and second layers 830, 840 are coupled together. In other embodiments, one or both of the bottom surface 831 of the first layer 830 and/or the top surface 841 of the second layer 840 may be textured to create the gap 850 when the first and second layers 830, 840 are coupled together. In still other embodiments, one or both of the bottom surface 831 of the first layer 830 and/or the top surface 841 of the second layer 840 may be dented so that when the first and second layers 830, 840 are coupled together the gap 850 exists. Other techniques for making the bottom surface 831 of the first layer 830 non-conformal with the top surface 841 of the second layer 840 when the first and second layers 830, 840 are coupled together may be used to form the gap 850 in other embodiments.

The gap 850 may be non-uniform and also discontinuous because there may be no gap in certain regions where the bottom surface 831 of the first layer 830 contacts the top surface 841 of the second layer 840. The width of the gap 850 may be less than 5 mm, less than 4 mm, less than 3 mm, or more specifically less than 2 mm. The width of the gap 850 may be approximately 1 mm, with approximately including a tolerance of 5%. The gap 850 may be a practical air gap formed due to the non-conformal surface contact between the first and second layers 830, 840 as described herein. The gap 850 may be an interstitial space that exists between the first and second layers 830, 840. The interstitial space or gap 850 may be evacuated of air. The interstitial space or gap 850 may have a negative pressure. An insulation material, some examples of which are provided above, may be located in the gap 850 in some embodiments.

As with the prior embodiments, the top plate 810 may comprise holes 801 for receiving fasteners that are used to couple the first impact limiter 500 and the thermal shield 800 to the containment vessel 100. The holes 801 may extend from an opening in the top surface 811 of the top plate 810 to an opening in the bottom surface 812 of the top plate 810. Thus, the holes 801 may extend through the first and second layers 830, 840 of the top plate 810.

Figure 14:
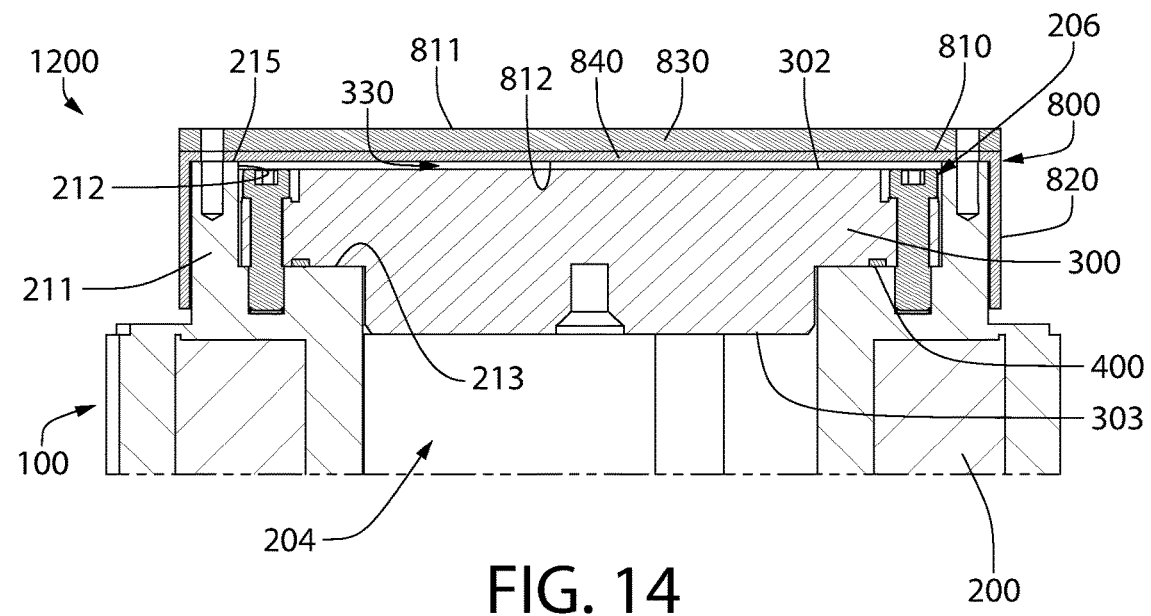
FIG. 14 is a close-up view of area IX of FIG. 8 in accordance with another alternative embodiment of the present invention, whereby the impact limiter has been omitted.

Referring to FIGS. 14, a portion of a system for transporting radioactive materials 1200 is illustrated in accordance with an alternative embodiment of the present invention. The system 1200 is identical to the systems 1000, 1100 except for the differences specifically mentioned herein. In particular, the system 1200 comprises the containment vessel 100 which includes the vessel body 200, the lid 300, and the lid seal 400, all of which are substantially identical to those components as described above with reference to the systems 1000, 1100 (any modification/difference will be noted below). Furthermore, the system 1200 includes the first impact limiter 500 and the second impact limiter 550, although those components are not depicted in FIG. 14 to avoid clutter. It should be understood that any component, structure, or portion of the system 1200 which is not illustrated in FIG. 14 is identical to the same component, structure, or portion of the system 1000 described above. Finally, the system 1200 includes the thermal shield 800 described above with reference to FIGS. 13A and 13B. Of course, any of the thermal shields 600, 700, 800 (or thermal shield embodiments described below) could be used in the system 1200.

The upper portion of the vessel body 200 comprises the annular collar 211 which extends from the seal seat 213 to a distal end 215 of the annular collar 211. The inner surface 212 of the annular collar 211 and the seal seat 213 collectively define the entry passageway 206. The lid 300 is positioned within the entry passageway 206. The lid 300 comprises a top surface 302 and a bottom surface 303 that is opposite the top surface 302. The lid seal 400 is compressed between a portion of the bottom surface 303 of the lid 300 and the seal seat 213 (as discussed in more detail above).

The thermal shield 800 is positioned over the distal end 215 of the annular collar 211 and over the top surface 302 of the lid 300. The annular skirt 820 of the thermal shield 800 may circumscribe a portion of the annular collar 211. In the exemplified embodiment, the bottom surface 812 of the top plate 810 of the thermal shield 800 is spaced apart from the top surface 302 of the lid 300 by a gap 330. That is, there is no contact between the bottom surface 812 of the top plate 810 of the thermal shield 800 and the top surface 302 of the lid 300. In the exemplified embodiment, this gap 330 is formed by recessing the top surface 330 of the lid 300 relative to the distal end 215 of the annular collar 211 of the vessel body 200. As seen in FIG. 14, the lid 300 is recessed within the entryway passage 206 such that the top surface 302 of the lid 300 is located below a plane on which the distal end 215 of the annular collar 211 lies. In this embodiment, the gap 330 is defined by the top surface 302 of the lid 300, the bottom surface 812 of the top plate 810 of the thermal shield 800, and the inner surface 212 of the annular collar 211 of the vessel body 200.

There are alternative ways that the gap 330 can be created. For example, there may be support members located on the distal end 215 of the annular collar 211 which protrude from the distal end 215 of the annular collar 211. The thermal shield 800 may be positioned such that the bottom surface 812 of the top plate 810 is in contact with and supported by the support members. In this situation, even if the top surface 302 of the lid 300 is flush with the distal end 215 of the annular collar 211, there will be a gap, such as the gap 330, between the top surface 302 of the lid 300 and the bottom surface 812 of the thermal shield 800. Another alternative would be to include protuberances that extend from the bottom surface 812 of the thermal shield 800 in a position such that the protuberances contact the distal end 215 of the annular collar 211 when the thermal shield 800 is positioned over the annular collar 211. These are some of the non-limiting techniques that may be used to create/form the gap 330 described herein and depicted in FIG. 14.

Figure 15:
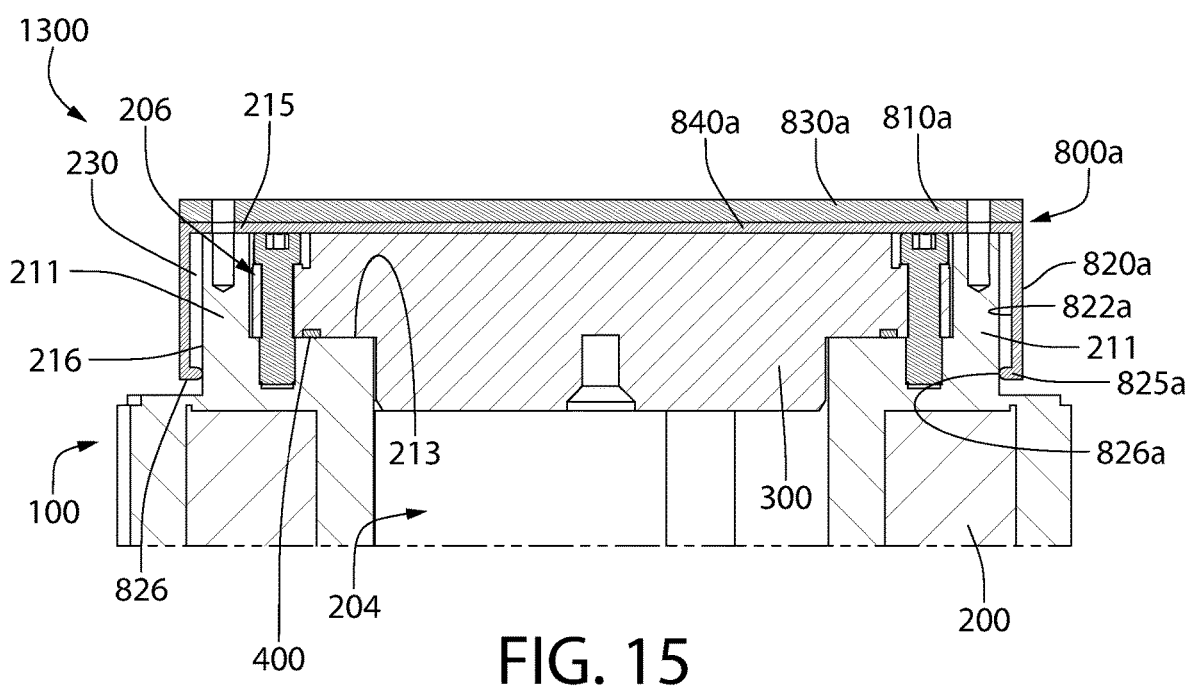
FIG. 15 is a close-up view of area IX of FIG. 8 in accordance with yet another alternative embodiment of the present invention, whereby the impact limiter has been omitted.

Referring to FIGS. 15, a portion of a system for transporting radioactive materials 1300 is illustrated in accordance with another alternative embodiment of the present invention. The system 1300 is identical to the systems 1000, 1100, 1200 except for the differences specifically mentioned herein. In particular, the system 1300 comprises the containment vessel 100 which includes the vessel body 200, the lid 300, and the lid seal 400, all of which are substantially identical to those components as described above with reference to the systems 1000, 1100, 1200 (any modification/difference will be noted below). Furthermore, the system 1300 includes the first impact limiter 500 and the second impact limiter 550, although those components are not depicted in FIG. 15 to avoid clutter. It should be understood that any component, structure, or portion of the system 1300 which is not illustrated in FIG. 15 is identical to the same component, structure, or portion of the system 1000 described above. Finally, the system 1300 includes a thermal shield 800a which is similar to the thermal shield 800 described above, with a slight modification. It should be appreciated that any of the thermal shields 600, 700, 800 (or thermal shield embodiments described below) could be used in the system 1300, with the modification noted below.

As with the prior embodiments, the lid 300 is positioned within the entry passageway 206 defined by the annular collar 211 and the seal seat 213. In this embodiment, the top surface 302 of the lid 300 is even or flush with the distal end 215 of the annular collar 211, although this is not required and the top surface 302 of the lid 300 may be recessed relative to the distal end 215 of the annular collar 211 similar to what is shown in FIG. 14. The thermal shield 800a is positioned over the annular collar 211 so that the top plate 810a of the thermal shield 800a is atop of the distal end 215 of the annular collar 211 and the annular skirt 820a of the thermal shield 800a circumscribes at least a portion of the annular collar 211.

In this embodiment, the thermal shield 800a comprises the top plate 810a and the annular skirt 820a, similar to the embodiment of the thermal shield 800a described above. The top plate 810a may be a multi-layer construction comprising the first layer 830a and the second layer 840a, although this is not required and the top plate 810a could be a single layer construction similar to the thermal shield 600. Moreover, in this embodiment the thermal shield 800a comprises an annular lip or ridge or rib 825a that protrudes from the inner surface 822a of the annular skirt 820a. In the exemplified embodiment, the annular lip 825a is located adjacent to the distal end 821a of the annular skirt 820a, although the annular lip 825a could be located at other positions along the inner surface 822a of the annular skirt 820a in other embodiments.

When the thermal shield 800a is positioned over the annular collar 211 of the vessel body 200, a distal end 826a of the annular lip 825a contacts an outer surface 216 of the annular collar 211 while a remainder of the inner surface 822a of the annular skirt 820a is spaced apart from the outer surface 216 of the annular collar 211 by a gap 230. The gap 230 exits between the inner surface 822a of the annular skirt 820a of the thermal shield 800a and the outer surface 216 of the annular collar 211 of the vessel body 200. The gap 230 may be an annular gap in some embodiments. In some embodiments, the features of FIG. 15 may be combined with the features of FIG. 14 to create the gap 330 and the gap 230 in the same embodiment. Such gaps 230, 330, when filled with air, evacuated to negative pressure, or filled with an insulating material, may assist in blocking the ingress of heat, such as from a fire, towards the storage cavity 204 to protect the integrity of the lid seal 400, among other potential benefits.

Figure 16:
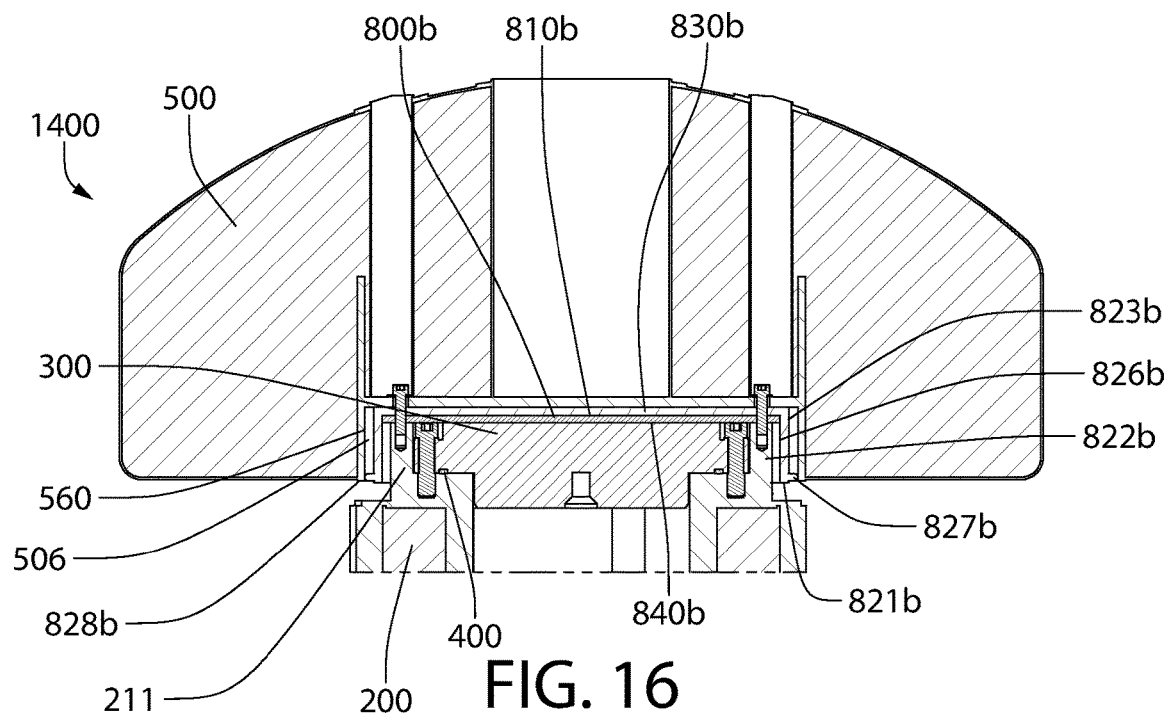
FIG. 16 is a close-up view of area IX of FIG. 8 in accordance with still another alternative embodiment of the present invention.

Referring to FIGS. 16, a portion of a system for transporting radioactive materials 1400 is illustrated in accordance with another alternative embodiment of the present invention. The system 1400 is identical to the systems 1000, 1100, 1200, 1300 except for the differences specifically mentioned herein. In particular, the system 1400 comprises the containment vessel 100 which includes the vessel body 200, the lid 300, and the lid seal 400, all of which are substantially identical to those components as described above with reference to the systems 1000, 1100, 1200, 1300 (any modification/difference will be noted below). Furthermore, the system 1300 includes the first impact limiter 500 and the second impact limiter 550, although only the first impact limiter 500 is depicted in FIG. 16. It should be understood that any component, structure, or portion of the system 1400 which is not illustrated in FIG. 16 is identical to the same component, structure, or portion of the system 1000 described above. Finally, the system 1400 includes a thermal shield 800b which is similar to the thermal shield 800 described above, with a slight modification. It should be appreciated that any of the thermal shields 600, 700, 800 (or thermal shield embodiments described below) could be used in the system 1400, with the modification noted below.

In this embodiment, the thermal shield 800b comprises the top plate 810b and the annular skirt 820b. The top plate 810b may comprise the first and second layers 830b, 840b, or may be a singular layer. The annular skirt 820b comprises a distal end 821b, an inner surface 822b, and an outer surface 823b. Furthermore, the annular skirt 820b comprises an annular lip, rib, or ridge 827b that protrudes from the outer surface 823b of the annular skirt 820b. In the exemplified embodiment, the annular lip 827b protrudes from the outer surface 823b of the annular skirt 820b adjacent to the distal end 821b, although the annular lip 827b could be located at other positions along the outer surface 823b in other embodiments. The annular lip 827b may terminate in a distal end 828b.

The lid 300 is positioned within the entry passageway 206 of the vessel body 200 and coupled to the vessel body 200. The thermal shield 800b is positioned over the annular collar 211 of the vessel body 200 (and also over top of the lid 300). The first impact limiter 500 is positioned over the thermal shield 800b. In this embodiment, the distal end 828b of the annular lip 827b is in contact with a sidewall 506 of the depression 505 of the first impact limiter 500. As such, there is a gap 560 between the outer surface 823b of the annular skirt 820b and the sidewall 506 of the depression 505 of the first impact limiter 500. There may also exist a gap between the inner surface 822b of the annular skirt 820b and the outer surface of the annular collar 211, although in other embodiments the inner surface 822b of the annular skirt 820b may contact the outer surface of the annular collar 211.

Figure 17A:
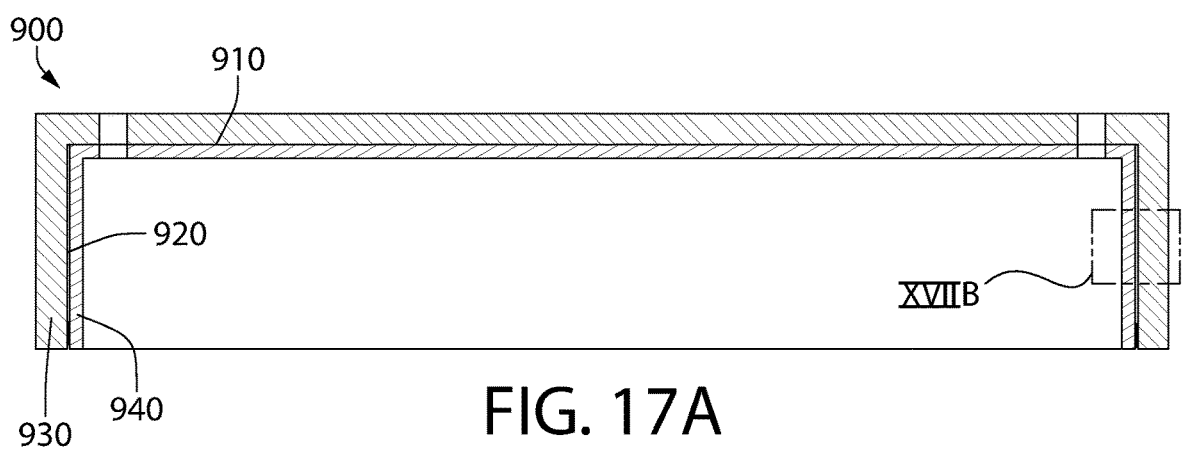
FIG. 17A is a cross-sectional view of a thermal shield in accordance with another alternative embodiment of the present invention.
Figure 17B:
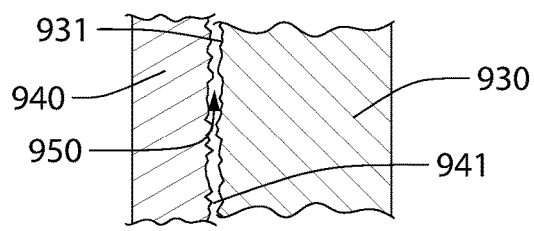
FIG. 17B is a close-up view of area XVIIB of FIG. 17A.

Referring to FIGS. 17A and 17B, a thermal shield 900 will be described in accordance with yet another embodiment of the present invention. The thermal shield 900 may be used in any of the systems 1000, 1100, 1200, 1300, 1400 described herein. That is, the thermal shield 900 may be used in place of any of the thermal shields 600, 700, 800, 800a, 800b. In this embodiment, the thermal shield 900 comprises a top plate 910 and an annular skirt 920 extending downwardly from a bottom surface 911 of the top plate 910. In this embodiment, the thermal shield 900 is a multi-layer structure including a first layer 930 and a second layer 940. However, in some embodiments the annular skirt 920 may be a multi-layer structure and the top plate 910 may be a single layer structure.

With particular focus on the annular skirt 920, the first layer 930 may comprise an inner surface 931 and the second layer 940 may comprise an inner surface 941 that faces the inner surface 931 of the first layer 930. The first and second layers 930, 940 of the annular skirt 920 of the thermal shield 900 may not be in conformal contact with one another, such that an interstitial space 950 may exist between the first and second layers 930, 940. The interstitial space 950 may form a gap between the inner surfaces 931, 941 of the first and second layers 930, 940. The interstitial space 950 may be non-uniform in its width measured between the inner surfaces 931, 941 of the first and second layers 930, 940. The interstitial space 950 may be non-continuous such that portions of the inner surfaces 931, 941 of the first and second layers 930, 940 may be in contact while other portions of the inner surfaces 931, 941 of the first and second layers 930, 940 are not in contact. Thus, the interstitial space 950 may form an air gap that helps to block the ingress of heat from a fire or other heat source towards the storage cavity 204 and towards the lid seal 400, as has been described in detail herein.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A system for transporting radioactive materials, the system comprising:
    a containment vessel extending along a longitudinal axis from a top end to a bottom end, the containment vessel comprising:
        a vessel body having a storage cavity configured to receive radioactive materials;
        a lid coupled to an upper portion of the vessel body to enclose a top end of the storage cavity; and
        a lid seal positioned between the lid and the upper portion of the vessel body to hermetically seal the top end of the storage cavity;
    a thermal shield comprising a top plate and an annular skirt extending downward from the top plate to form a thermal shield cavity;
    a first impact limiter configured to absorb kinetic energy; and
    the first impact limiter and the thermal shield coupled to the containment vessel, the thermal shield located between the first impact limiter and the containment vessel so that the lid seal is located within the thermal shield cavity.

2. The system according to claim 1 wherein the first impact limiter comprises a body portion having a bottom surface and a first depression formed in the bottom surface, the top plate of the thermal shield located within the first depression of the first impact limiter, and wherein at least a portion of the annular skirt of the thermal shield is located within the first depression of the first impact limiter.

3. The system according to claim 1 further comprising:
    the upper portion of the vessel body comprising an annular collar extending upward from a main body portion of the vessel body, the annular collar forming an entry passageway into the storage cavity;

the lid positioned in the entry passageway of the annular collar; and the thermal shield positioned over the annular collar so that the top plate of the thermal shield is atop the annular collar and the annular skirt circumscribes at least a portion of the annular collar.

4. The system according to claim 3 further comprising a first gap between a bottom surface of the top plate of the thermal shield and a top surface of the lid.

5. The system according to claim 3 wherein an annular gap exists between an inner surface of the annular skirt of the thermal shield and an outer surface of the annular collar of the vessel body.

6. The system according to claim 3 wherein the lid seal is compressed between the lid and a seal seat of the annular collar.

7. The system according to claim 1 wherein the top plate of the thermal shield is a multi-layer construction comprising a first layer and a second layer.

8. The system according to claim 7 wherein the first layer has a lower surface adjacent a top surface of the second layer, where in the lower surface of the first layer and the top surface of the second layer are not in conformal surface contact.

9. The system according to claim 8 wherein an interstitial space exists between the first and second layers.

10. The system according to claim 9 wherein the interstitial space has a negative pressure.

11. The system according to claim 1 wherein the top plate of the thermal shield overlies an entirety of the lid.

12. The system according to claim 1 wherein an outer surface of the thermal shield is a polished surface.

13. The system according to claim 1 wherein the thermal shield is formed of an austenitic stainless steel.

14. The system according to claim 1 wherein the first impact limiter comprises a body portion comprising a metal enclosure filled with a fire-resistant polyurethane.

15. A system for transporting radioactive materials, the system comprising:

a containment vessel extending along a longitudinal axis from a top end to a bottom end, the containment vessel comprising:

a vessel body having a storage cavity configured to receive radioactive materials; and a lid coupled to an upper portion the vessel body to enclose a top end of the storage cavity;

a thermal shield comprising a top plate, the top plate being a multi-layer construct comprising a first layer and a second layer;

a first impact limiter configured to absorb kinetic energy; and the first impact limiter and the thermal shield coupled to the containment vessel, the top plate of the thermal shield located between the first impact limiter and the lid of the containment vessel.

16. The system according to claim 15 wherein the first layer has a lower surface adjacent a top surface of the second layer, wherein the lower surface of the first layer and the top surface of the second layer are not in conformal surface contact.

17. The system according to claim 16 wherein an interstitial space exists between the first and second layers, wherein the interstitial space has a negative pressure.

18. The system according to claim 15 wherein the top plate of the thermal shield overlies an entirety of the lid.

19. The system according to claim 15 wherein an outer surface of the thermal shield is a polished surface.

20. A system for transporting radioactive materials, the system comprising:

a containment vessel extending along a longitudinal axis from a top end to a bottom end, the containment vessel comprising:

a vessel body having a storage cavity configured to receive radioactive materials;

a lid coupled to an upper portion of the vessel body to enclose a top end of the storage cavity; and a lid seal positioned between the lid and the upper portion of the vessel body to hermetically seal the top end of the storage cavity;

a thermal shield comprising a top plate having an effective thermal conductivity of 3 Watts/(Meter×Kelvin) or less;

a first impact limiter configured to absorb kinetic energy; and the first impact limiter and the thermal shield coupled to the containment vessel, the top plate of the thermal shield located between the first impact limiter and the lid of the containment vessel.

\* \* \* \* \*